(12) United States Patent
Denoual et al.

(10) Patent No.: US 11,765,407 B2
(45) Date of Patent: Sep. 19, 2023

(54) METHOD, DEVICE, AND COMPUTER PROGRAM FOR TRANSMITTING MEDIA CONTENT

(71) Applicant: CANON KABUSHIKI KAISHA, Tokyo (JP)

(72) Inventors: Franck Denoual, Saint Domineuc (FR); Frédéric Maze, Langan (FR); Naël Ouedraogo, Val d'Anast (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/255,374

(22) PCT Filed: Jun. 20, 2019

(86) PCT No.: PCT/EP2019/066334
§ 371 (c)(1),
(2) Date: Dec. 22, 2020

(87) PCT Pub. No.: WO2020/002122
PCT Pub. Date: Jan. 2, 2020

(65) Prior Publication Data
US 2021/0377581 A1 Dec. 2, 2021

(30) Foreign Application Priority Data
Jun. 27, 2018 (GB) ..................................... 1810563

(51) Int. Cl.
*H04N 21/2343* (2011.01)
*H04N 21/235* (2011.01)

(52) U.S. Cl.
CPC ... *H04N 21/23439* (2013.01); *H04N 21/2358* (2013.01)

(58) Field of Classification Search
CPC ..................... H04N 21/23439; H04N 21/2358
See application file for complete search history.

(56) References Cited

U.S. PATENT DOCUMENTS

2011/0064146 A1* 3/2011 Chen ................ H04N 21/85406
375/240.26
2017/0289556 A1 10/2017 Hendry et al.
(Continued)

FOREIGN PATENT DOCUMENTS

GB 2539462 A 12/2016
GB 2550604 A 11/2017
(Continued)

OTHER PUBLICATIONS

Franck Denoual, et al., Sub-picture Tracks Description in ISOBMFF, MPEG Meeting, ISO/IEC JTC1/SC29/WG11, Coding of Moving Pictures and Audio, Oct. 23-27, 2017, Macau, CN, Oct. 18, 2017, 9 pages, Doc. No. M41608, XP30069950.
(Continued)

*Primary Examiner* — Randy A Flynn
(74) *Attorney, Agent, or Firm* — Canon U.S.A., Inc. IP Division

(57) ABSTRACT

A method for encapsulating encoded timed media data into at least a first and a second track belonging to one same group of tracks, said media data corresponding to one or more video sequences made up of full frames. The method includes for at least first or second track providing descriptive information about the spatial relationship of a first spatial part of one frame encapsulated in the first track. A second spatial part of said frame encapsulated in the second track, wherein said descriptive information, shared by the tracks belonging to a same group of tracks, indicates whether the region, covered by both the first and the second spatial parts, forms a full frame or not.

7 Claims, 18 Drawing Sheets

(56) References Cited

U.S. PATENT DOCUMENTS

2018/0061002 A1    3/2018  Lee et al.
2018/0109817 A1*   4/2018  Wang ............... H04N 21/85406
2018/0255325 A1*   9/2018  Rombakh .............. H04N 19/44

FOREIGN PATENT DOCUMENTS

WO      2015/104303 A2     7/2015
WO      WO-2017134110 A1 *  8/2017   ......... H04N 21/8456

OTHER PUBLICATIONS

Frédéric Maze, Proposed text for Spatial Relationship Track Grouping for OMAF, MPEG Meeting, ISO/IEC JTC1/SC29/WG11, Coding of Moving Pictures and Audio, Apr. 16-20, 2018, San Diego, CA, US, Apr. 19, 2018, 4 pages, Doc. No M42812, XP30071151.

Franck Denoual, et al., Report on CE for Sub-picture Tracks Description in OMAF, MPEG Meeting, ISO/IEC JTC1/SC29/WG11, Coding of Moving Pictures and Audio, Apr. 16-20, 2018, San Diego, CA, US, Apr. 16, 2018, 7 pages, Doc. No. M42582, XP30070921.

Franck Denoual, et al., [OMAF] Additional Indications for Sub-picture Tracks, MPEG Meeting, ISO/IEC JTC1/SC29/WG11, Coding of Moving Pictures and Audio, Jul. 16-20, 2018, Ljubljana, SL, Jul. 6, 2018, 5 pages, Doc. No. M43420, XP30196128.

Franck Denoual, et al., [OMAF] Merging Sub-picture Tracks, MPEG Meeting, ISO/IEC JTC1/SC29/WG11, Coding of Moving Pictures and Audio, Jul. 16-20, 2018, Ljubljana, SL, Jul. 6, 2018, 6 pages, Doc. No. M43421, XP30196129.

* cited by examiner

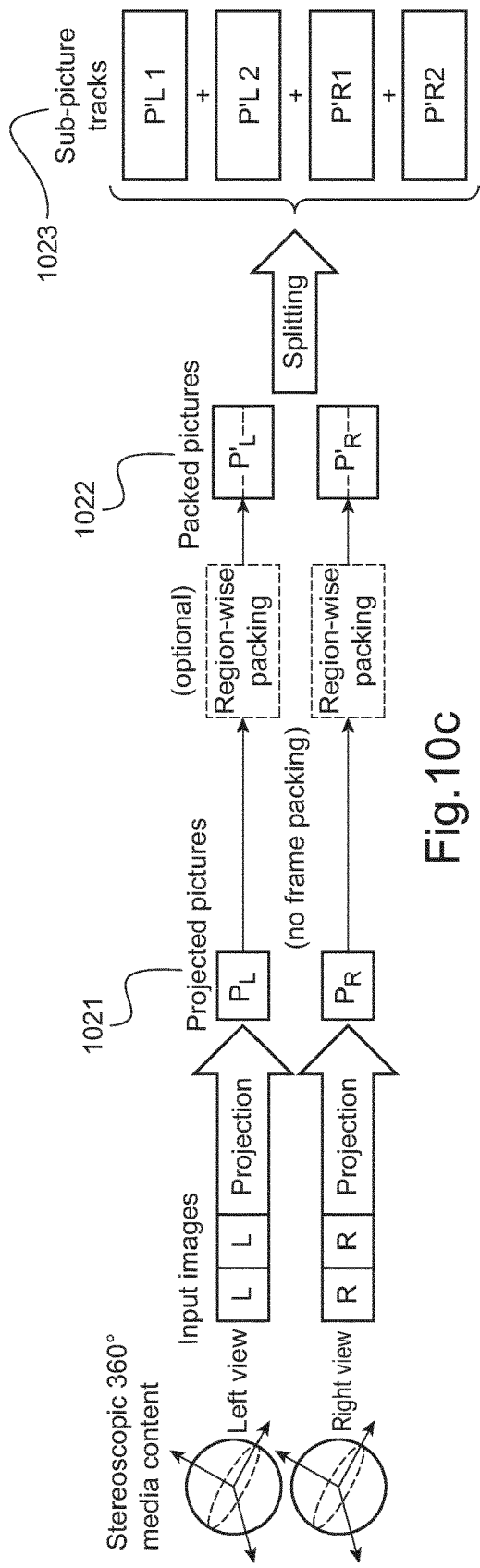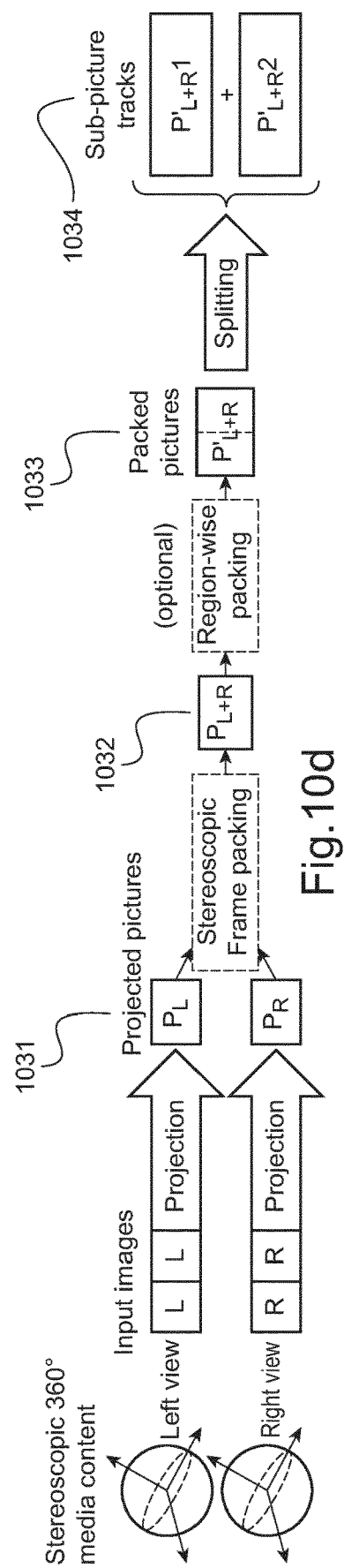
Fig. 10c
Fig. 10d

METHOD, DEVICE, AND COMPUTER PROGRAM FOR TRANSMITTING MEDIA CONTENT

CROSS-REFERENCE TO RELATED APPLICATIONS

The application is the National Phase application of PCT Application No. PCT/EP2019/066334, filed on Jun. 20, 2019 and titled "METHOD, DEVICE, AND COMPUTER PROGRAM FOR TRANSMITTING MEDIA CONTENT". This application claims the benefit under 35 U.S.C. § 119(a)-(d) of United Kingdom Patent Application No. 1810563.5, filed on Jun. 27, 2018 and titled "METHOD, DEVICE, AND COMPUTER PROGRAM FOR TRANSMITTING MEDIA CONTENT". The above cited patent applications are incorporated herein by reference in their entirety.

FIELD OF THE INVENTION

The present invention relates to methods and devices for encapsulating and transmitting media data.

BACKGROUND OF THE INVENTION

The invention is related to encapsulating, media content, e.g. according to ISO Base Media File Format as defined by the MPEG standardization organization, to provide a flexible and extensible format that facilitates interchange, management, editing, and presentation of media content and to improve its delivery for example over an IP network such as Internet using adaptive http streaming protocol.

The International Standard Organization Base Media File Format (ISO BMFF, ISO/IEC 14496-12) is a well-known flexible and extensible format that describes encoded timed media data bit-streams either for local storage or transmission via a network or via another bit-stream delivery mechanism. An example of extensions is ISO/IEC 14496-15 that describes encapsulation tools for various NAL (Network Abstraction Layer) unit based video encoding formats. Examples of such encoding formats are AVC (Advanced Video Coding), SVC (Scalable Video Coding), HEVC (High Efficiency Video Coding), and L-HEVC (Layered HEVC). Another example of file format extensions is ISO/IEC 23008-12 that describes encapsulation tools for still images or sequence of still images such as HEVC Still Image. Another example of file format extensions is ISO/IEC 23090-2 that defines the omnidirectional media application format (OMAF). The ISO Base Media file format is object-oriented. It is composed of building blocks called boxes (or data structures characterized by a four characters code) that are sequentially or hierarchically organized and that define parameters of the encoded timed media data bit-stream such as timing and structure parameters. In the file format, the overall presentation is called a movie. The movie is described by a movie box (with the four character code 'moov') at the top level of the media or presentation file. This movie box represents an initialization information container containing a set of various boxes describing the presentation. It is logically divided into tracks represented by track boxes (with the four character code 'trak'). Each track (uniquely identified by a track identifier (track_ID)) represents a timed sequence of media data belonging to the presentation (frames of video, for example). Within each track, each timed unit of data is called a sample; this might be a frame of video, audio or timed metadata. Samples are implicitly numbered in sequence. The actual sample data are stored in boxes called Media Data Boxes (with the four character code 'mdat') at the same level as the movie box. A description of the samples is stored in the metadata part of the file in a SampleTableBox. The movie can be organized temporally as a movie box containing information for the whole presentation followed by a list of couple movie fragment and Media Data boxes. Within a movie fragment (box with the four character code 'moof') there is a set of track fragments (box with the four character code 'traf'), zero or more per movie fragment. The track fragments in turn contain zero or more track run boxes ('trun'), each of which document a contiguous run of samples for that track fragment.

An ISOBMFF file may contain multiple encoded timed media data bit-streams or sub-parts of encoded timed media data bit-streams forming multiple tracks. When sub-parts corresponds to one or successive spatial parts of a video source, taken over the time (e.g. at least one rectangular region, sometimes called 'tile', taken over the time), the corresponding multiple tracks may be called sub-picture tracks. ISOBMFF and its extensions comprise several grouping mechanisms to group together tracks, static items, or samples. A group typically shares common semantic and/or characteristics.

For instance, ISOBMFF comprises an entity group mechanism, a track group mechanism, and a sample grouping mechanism. The entity grouping mechanism can be used to indicate that tracks and/or static items are grouped according to an indicated grouping type or semantic. The track grouping mechanism can be used to indicate that tracks are grouped according to an indicated grouping type or semantic. The sample grouping mechanism can be used to indicate that certain properties associated with an indicated grouping type or semantic apply to an indicated group of samples within a track. For example, sub-picture tracks from a same source may be grouped using the track group mechanism.

To improve user experience, timed media data bit-streams (videos and even audio) may be recorded in very high definition videos (e.g. 8k by 4k pixels or more). To improve user experience and in particular to offer immersive experience, timed media data bit-streams (videos and even audio) may be omnidirectional (or multi-directional or pluri-directional). When applied to videos, also known as 360° panoramic video, the user feels to be located in the scene that is displayed.

An omnidirectional video may be obtained from a 360° camera and/or by combining images of video streams obtained from several cameras, for example mounted on a special rig so that all the cameras have a common nodal point. Such a combination of images is known as image stitching or camera stitching.

Such an omnidirectional video may be rendered via head mounted displays according to the user's viewing orientation or through projection onto a curved screen surrounding users. It may also be displayed on traditional 2D screens with navigation user interface to pan into the omnidirectional video according to user's desired part of the omnidirectional video (also known as viewport). It is often referred to as virtual reality (VR) since the user feels to be in a virtual world. When virtual objects are added to the omnidirectional video, it is referred to as augmented reality (AR).

The inventors have noticed several problems when describing and signaling information about the media data to transmit, in particular when the media content is split into several sub-parts carried by multiple sub-picture tracks.

An example involves the signaling of sub-picture tracks requesting a specific parsing process from the client, which generates overhead and is complex.

Another example concerns the signaling of group of tracks or sub-picture tracks and in particular the possible association between these groups of tracks or sub-picture tracks.

Another example involves the signaling of the sub-picture tracks that are allowed or not to be combined to rebuild an omnidirectional media content ready for display. The existing solutions are either complex or not well defined and not fully compliant with existing mechanisms for two dimensional multi-tracks encapsulation process.

SUMMARY OF THE INVENTION

The present invention has been devised to address one or more of the foregoing concerns.

In this context, there is provided a solution for streaming media content (for example omnidirectional media content), for example over an IP network such as Internet using the http protocol.

According to a first aspect of the invention there is provided a method for encapsulating encoded timed media data into at least a first and a second track belonging to one same group of tracks, said media data corresponding to one or more video sequences made up of full frames, the method comprising for at least first or second track providing descriptive information about the spatial relationship of a first spatial part of one frame encapsulated in the first track, with a second spatial part of said frame encapsulated in the second track, wherein said descriptive information, shared by the tracks belonging to a same group of tracks, indicates whether the region, covered by both the first and the second spatial parts, forms a full frame or not.

In particular, each group shares a particular characteristic or the tracks within a group have a particular relationship.

In an embodiment, said descriptive information is provided in a same data structure comprising descriptive information shared by all the tracks of the group of tracks.

In an embodiment, the data structure is a TrackGroupTypeBox.

In an embodiment, said descriptive information comprising a parameter provided for all the tracks of the group of tracks, taking a first value when the region covered by the first and the second spatial part is a full frame and a second value when the region covered by the first and the second spatial part is not a full frame.

In an embodiment, said descriptive information further comprising parameters for signaling the missing spatial parts from the full frame, when the region covered by the first and the second spatial parts is not the full frame.

According to a second aspect of the invention, it is proposed a method for encapsulating encoded timed media data into a plurality of tracks belonging to at least a first or a second group of tracks of a same group type, wherein the method comprising for the tracks of the plurality of tracks belonging to the first group of tracks providing descriptive information indicating that at least one track belonging to the first group of tracks and at least one track belonging to the second group of tracks are switchable.

In an embodiment, said descriptive information is shared by all the tracks belonging to the first group of tracks.

In an embodiment, said descriptive information is provided in a same data structure comprising descriptive information shared by all the tracks of the group of tracks.

In an embodiment, the data structure comprising identifiers for signaling the groups of tracks whose tracks are switchable with the tracks of the first group of tracks.

In an embodiment, said descriptive information is a dedicated data structure containing only one or more parameters signaling the groups of tracks whose tracks are switchable with the tracks of the first group of tracks.

According to a third aspect of the invention, there is provided a method for encapsulating encoded media data corresponding to a wide view of a scene, the method comprising:

obtaining a projected picture from the wide view of the scene;

packing the obtained projected picture in at least one packed picture;

splitting the at least one packed picture into at least one sub-picture;

encoding the at least one sub-picture into a plurality of tracks;

generating descriptive metadata associated the encoded tracks, wherein the descriptive metadata comprise an item of information associated with each track being indicative of a spatial relationship between the at least one sub-picture encoded in the track and the at least one projected picture.

According to a fourth aspect of the invention, there is provided a method for generating a media file comprising capturing one or more video sequences made up of full frames, encoding media data corresponding to the frames of the one or more video sequences, encapsulating the encoded media data into at least a first and a second track belonging to one same group of tracks according to the encapsulating method of claim 1, and generating at least one media file comprising said first and second tracks.

According to a fifth aspect of the invention, there is provided a method for obtaining at least one frame from a media file comprising encoded timed media data encapsulated into at least a first and a second track belonging to one same group of tracks, said media data corresponding to one or more video sequences made up of full frames, the method comprising parsing information associated with the first and the second track, wherein the parsed information comprising descriptive information about the spatial relationship of a first spatial part of one frame encapsulated in the first track, with a second spatial part of said frame encapsulated in the second track, said descriptive information shared by all the tracks of the group of tracks, indicating whether the region covered by both the first and the second spatial part forms a full frame or not.

According to a sixth aspect of the invention, there is provided a method for generating a media file comprising encoding media data, encapsulating the encoded media data into a plurality of tracks belonging to at least a first or a second group of tracks, according to the encapsulating method of claim 8, and generating at least one media file comprising said first and second tracks.

According to a seventh aspect of the invention, there is provided a method for obtaining media data from a media file comprising encoded timed media data encapsulated into a plurality of tracks belonging to at least a first or a second group of tracks of a same group type, the method comprising parsing information associated with the first and the second track, wherein the parsed information comprising descriptive information indicating that at least one track belonging to the first group of tracks and at least one track belonging to the second group of tracks are switchable.

According to an eighth aspect of the invention, there is provided a computing device for encapsulating encoded timed media data into at least a first and a second track belonging to one same group of tracks, said media data corresponding to one or more video sequences made up of full frames, the computing device being configured for at least first or second track providing descriptive information about the spatial relationship of a first spatial part of one frame encapsulated in the first track, with a second spatial part of said frame encapsulated in the second track, wherein said descriptive information, shared by the tracks belonging to a same group of tracks, indicates whether the region, covered by both the first and the second spatial parts, forms a full frame or not.

According to a ninth aspect of the invention, there is provided a computing device for encapsulating encoded timed media data into a plurality of tracks belonging to at least a first or a second group of tracks of a same group type, the computing device being configured for providing, for the tracks of the plurality of tracks belonging to the first group of tracks, descriptive information indicating that at least one track belonging to the first group of tracks and at least one track belonging to the second group of tracks are switchable.

According to a tenth aspect of the invention, there is provided a computing device for obtaining at least one frame from a media file comprising encoded timed media data encapsulated into at least a first and a second track belonging to one same group of tracks, said media data corresponding to one or more video sequences made up of full frames, the computing device being configured for:

parsing information associated with the first and the second track, wherein the parsed information comprising descriptive information about the spatial relationship of a first spatial part of one frame encapsulated in the first track, with a second spatial part of said frame encapsulated in the second track, said descriptive information shared by all the tracks of the group of tracks, indicating whether the region covered by both the first and the second spatial part forms a full frame or not.

According to a eleventh aspect of the invention, there is provided a computing device for obtaining media data from a media file comprising encoded timed media data encapsulated into a plurality of tracks belonging to at least a first or a second group of tracks of a same group type, the computing device being configured for:

parsing information associated with the first and the second track, wherein the parsed information comprising descriptive information indicating that at least one track belonging to the first group of tracks and at least one track belonging to the second group of tracks are switchable.

According to a twelfth aspect of the invention, there is provided a computer program product for a programmable apparatus, the computer program product comprising a sequence of instructions for implementing a method according to the invention, when loaded into and executed by the programmable apparatus.

According to a thirteenth aspect of the invention, there is provided a computer-readable storage medium storing instructions of a computer program for implementing a method according to the invention.

According to a fourteenth aspect of the invention, there is provided a computer program which upon execution causes the method according to the invention to be performed.

BRIEF DESCRIPTION OF THE DRAWINGS

Further advantages of the present invention will become apparent to those skilled in the art upon examination of the drawings and detailed description. It is intended that any additional advantages be incorporated herein.

Embodiments of the invention are described below, by way of examples only, and with reference to the following drawings in which:

FIGS. 10a, 10b, 10c and 10d illustrate the several example of the overall process of projection, optional packing and splitting into sub-picture tracks according to embodiments of the invention;

FIG. 13, comprising

DETAILED DESCRIPTION OF EMBODIMENTS OF THE INVENTION

Figure 1A:
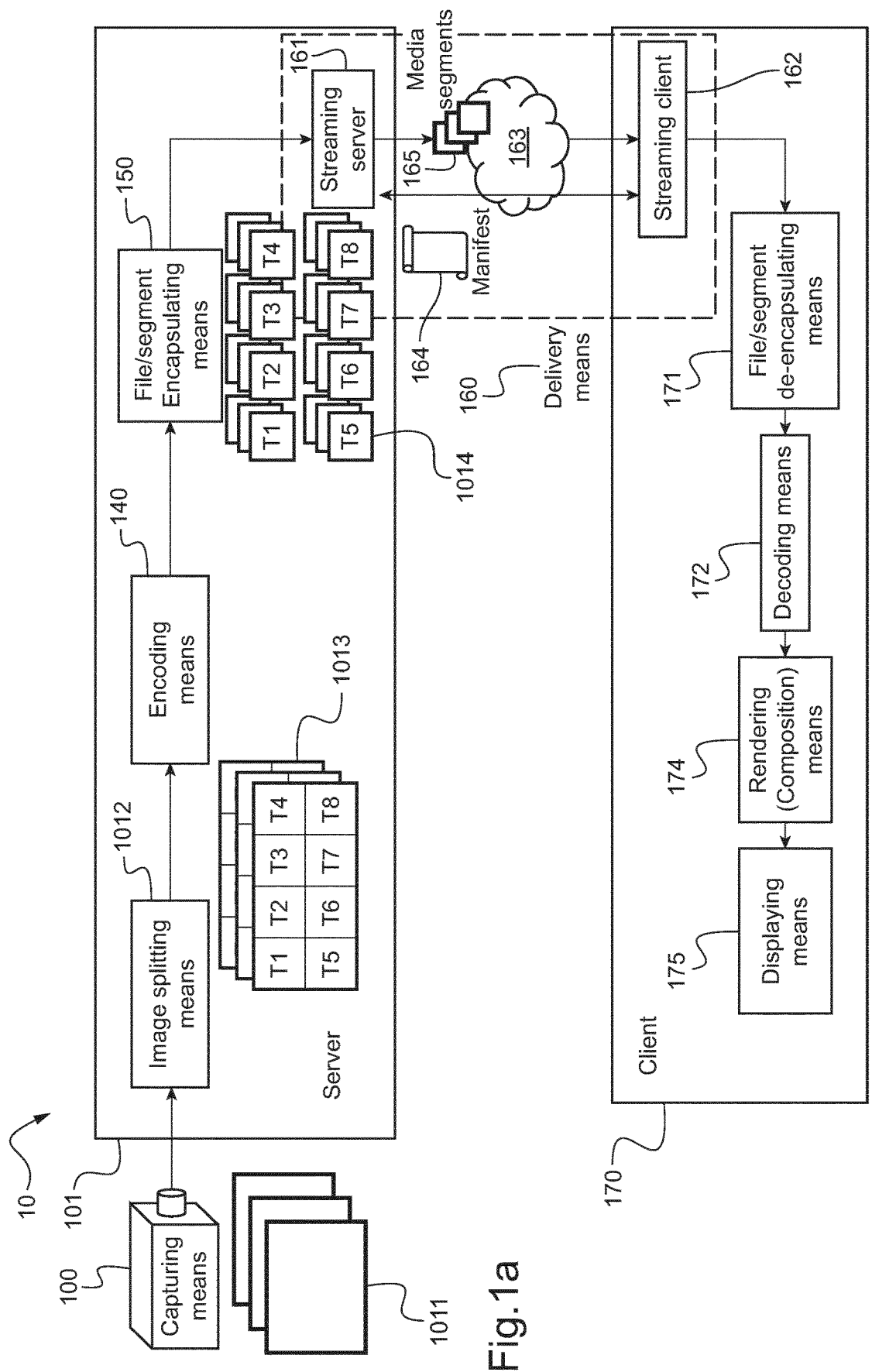
FIGS. 1a and 1b illustrate examples of a data flow for capturing, processing, encapsulating, transmitting, and rendering an omnidirectional video from a server to a client.

FIG. 1a illustrates an example of a system 10 implementing a transmitting method. The system 10 allows to flow media data, (for example 2D images). The system 10 comprises a server device 101 and a client device 170, said media data being transmitted from the server device 101 to the client device 170. As illustrated, the media data can be a video sequence 1011 captured by a camera system 100 and delivered to the client device 170, to be displayed on a 2D screen 175 (TV, tablet, smartphone . . . ), by a user for example.

The images 1011 forming the video sequence, are split by splitting means 1012 into spatial parts 1013 to be independently encoded by encoding means 140, in a preferred embodiment. Independently encoded means that one spatial part does not use any data from another spatial part as reference for differential or predictive encoding. For example, when the encoding means 140 is based on HEVC (High Efficiency Video Coding) compression format, the spatial parts 1013 can be encoded as independent tiles. In an alternative embodiment, the spatial parts 1013 can be encoded as motion-constrained tiles. The encoding means provide as many bitstreams as spatial parts or one bitstream with N independent sub-bitstreams (e.g. when HEVC is used for encoding independent tiles). Then, each provided bitstream or sub-bitstream is encapsulated by File/segment encapsulating means 150 into multiple sub-picture tracks 1014. The packaging or encapsulation format can be for example according to ISO Base Media File Format and ISO/IEC 14496-15, as defined by the MPEG standardization organization. Resulting file or segment files can be mp4 file or mp4 segments. During the encapsulation, audio stream may be added to the video bit-stream as well as metadata tracks providing descriptive information (metadata) about the video sequence or on the added audio streams.

The encapsulated file or segment files are then delivered to the client device 170 via delivery means 160, for example over IP network like Internet using http (HyperText Transfer Protocol) protocol or on a removable digital medium such as for example a disk or a USB key. For the sake of illustration, the delivery means 160 implement an adaptive streaming over HTTP such as DASH (Dynamic Adaptive Streaming over HTTP) from the MPEG standardization committee ("ISO/IEC 23009-1, Dynamic adaptive streaming over HTTP (DASH), Part1: Media presentation description and segment formats"). The delivery means may comprise a streaming server 161 and a streaming client 162. The media presentation description may provide description and URLs for media segments corresponding to the track encapsulating a video sequence comprising full images or to the sub-picture tracks only or both. The media presentation description may provide alternative groups of sub-picture tracks, each group allowing different reconstruction level of the scene captured by the camera 110. Alternative can be for example in terms of resolution, quality or bitrate, different splits (coarse or fine grid associated with the splitting means 1013).

Upon reception by the streaming client 162, the encapsulated media file or media segments are parsed by File/segment de-encapsulating means 171 so as to extract one or more data streams. The extracted data stream(s) is/are decoded at by decoding means 172. In case of ISOBMFF file or segments received by the File/segment de-encapsulating means 171, the parsing is typically handled by an mp4 reader or mp4 parser. From the descriptive metadata, the parser can extract encapsulated video bitstreams and/or video sub-bitstreams.

Next, optionally the decoded images or sub-images of the video sequence provided by the decoding means 172 are composed by rendering means 174 into resulting images for video rendering. The rendered video is and displayed on displaying means 175 like a screen (user device).

It is to be noted that video rendering depends on several parameters among which is the display size or the processing power of the client. The rendering may then consist in displaying only a subset of the parsed and decoded sub-picture tracks. This may be controlled by the rendering means 174 or directly in content selection by the streaming client 162.

It has been observed that transmission and rendering of several images of VHD (for 'Very High Definition') video streams may lead to a very high bitrate and very high resolution media data stream. Therefore, when taking into account the whole system, to avoid wasting bandwidth and to remain compliant with processing capabilities of the client players, there is a need to optimize access to the media data.

Such a need is even more important that a media data stream may be used for specific applications. In particular, a media data stream can be used for displaying images with dedicated displays like an array of projectors. It can also be used to display particular region of interest in the captured video 110.

Figure 1B:
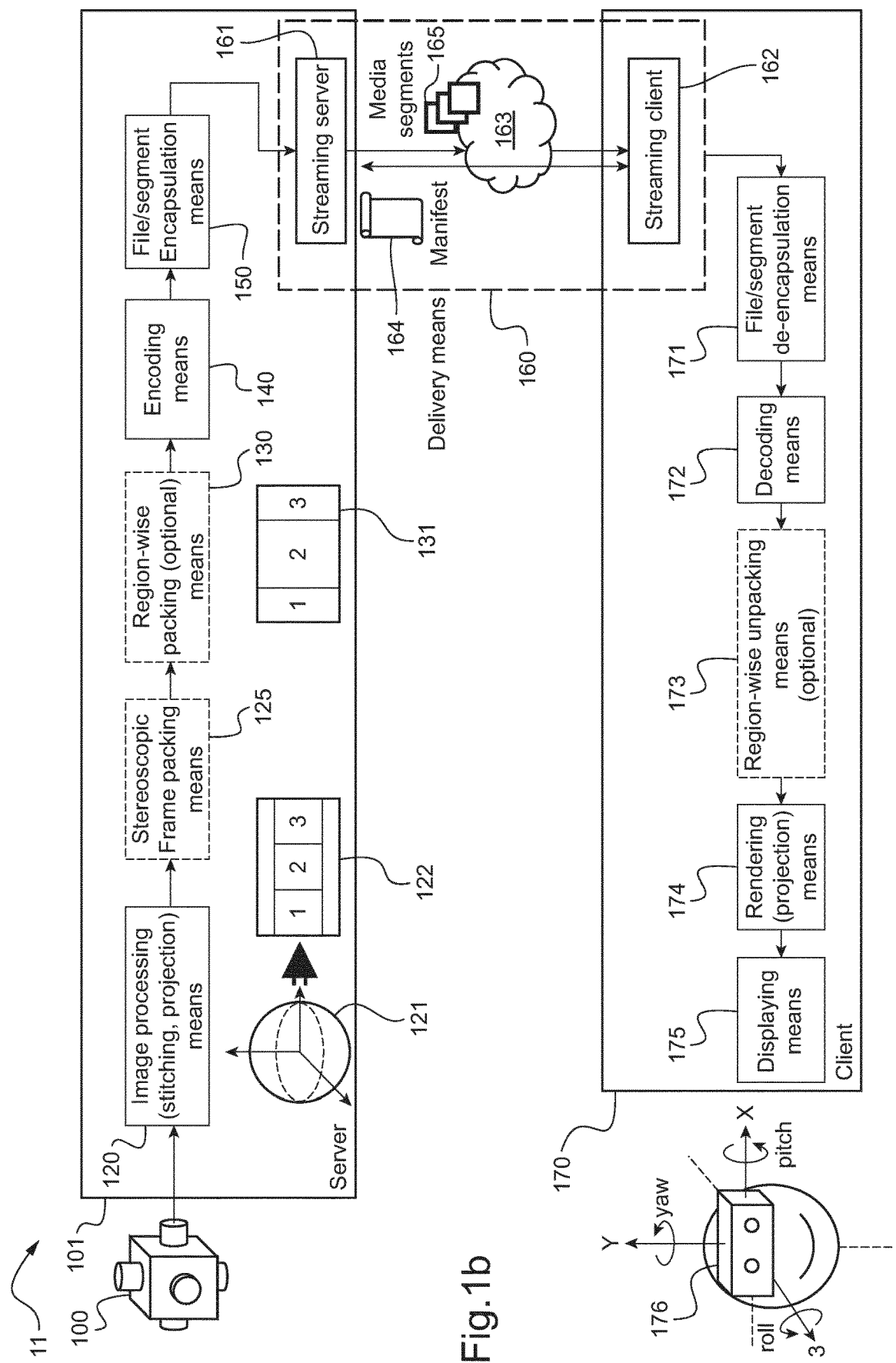

FIG. 1b illustrates another example of a system 11 implementing a transmitting method. The system 11 allows to flow omnidirectional media data. As illustrated, this media has a video content acquired from a camera system 100 and delivered to head-mounted display (HMD) 170 and 176. The camera system 100 may contain one camera with a wide angle lens or a set of multiple cameras assembled together (for example a camera rig for virtual reality). The delivery means 160 may perform a delivery for example over an IP network 163 such as Internet using an adaptive http streaming protocol via the streaming server 161 and the streaming client 162.

For the sake of illustration, the used camera system 100 is based on a set of six standard cameras, associated with each face of a cube. It is used to capture images representing the real scene surrounding the camera system. According to this arrangement, one camera provides front images, one camera provides rear images, one camera provides left images, one camera provides right images, one camera provides bottom images, and one camera provides top images.

The images obtained from camera system 100 are processed by image processing means in server 101 to create 360 images forming an omnidirectional video stream also called a 360 video stream or a virtual reality media data stream. The processing means 120 allows stitching and projecting captured images of the same time instance. Images are first stitched and projected onto a three-dimensional projection structure representing a sphere 121 forming a 360° view in both horizontal and vertical dimensions. The 360 image data on the projection structure is further converted onto a two-dimensional projected image 122 (also denoted a capturing projection), for example using an equirectangular projection (https://en.wikipedia.org/wiki/Equirectangular_projection). The projected image covers the entire sphere.

Alternatively, if the omnidirectional media is a stereoscopic 360-degree video, the camera system 100 may be composed of multiple cameras capturing image sequences representing a left view and a right view that can be used later on by the client to render a three-dimensional 360-degree scene. In such a case, the processing means 120 described above process both left-view and right-view images sequences separately. Optionally, frame packing may be applied by stereoscopic frame packing means 125, to pack each left view image and right view image of the same time instance onto a same projected image resulting on one single left+right projected images sequence. Several stereoscopic frame packing arrangements are possible, for instance, side-by-side, top-bottom, column based interleaving, row based interleaving, temporal interleaving of alternating left and right views. Alternatively, a stereoscopic frame packing arrangement may also consist in keeping left and right views in separate and independent projected images sequence resulting in independent video bit-streams after encoding by encoding means 140. For example, one video bit-stream represents the left view images and the other one does the right view images.

Optionally, region-wise packing by region-wise packing means 130 is then applied to map the projected image 122 onto a packed image 131. Region-wise packing consists in applying transformation (e.g. rotation, mirroring, copy or move of pixel blocks . . . ), resizing, and relocating of regions of a projected image in order for instance to maximize signal information on the most useful parts of the sphere for the user. It can be noted that the packed image may cover only a part of the entire sphere. If the region-wise packing is not applied, the packed image 131 is identical to the projected image 122. In case of stereoscopic omnidirectional media, region-wise packing applies either on the left+right projected images sequence, or separately on the left-view and right-view projected images sequences depending on the frame packing arrangement chosen by the stereoscopic frame-packing means 125.

The projected images 122 or packed images 131 are encoded by the encoding means 140 into one or several video bit-streams. In case of stereoscopic omnidirectional media, encoding step applies either on the left+right packed images sequence, or separately on the left-view and right-view packed images sequences depending on the frame packing arrangement chosen by the stereoscopic frame-packing means 125. Alternatively, Multi-View encoding can be used on the left-view and right-view packed images sequences.

Examples of encoding formats are AVC (Advanced Video Coding), SVC (Scalable Video Coding), HEVC (High Efficiency Video Coding) or L-HEVC (Layered HEVC). In the following, HEVC is used to refer to both HEVC and to its layered extensions (L-HEVC).

HEVC and similar video encoding formats define different spatial subdivisions of samples, e.g. pictures: tiles, slices and slice segments. A tile defines a rectangular region of a picture that is defined by horizontal and vertical boundaries (i.e., rows and columns) and that contains an integer number of Coding Tree Units (CTUs) or coding blocks, all referred to hereinafter coding units. As such, tiles are good candidates to represent spatial sub-parts of a picture. However, coded video data (bit-stream) organization in terms of syntax and its encapsulation into NAL units (or NALUs) is rather based on slices and slice segments (as in AVC).

A slice in HEVC is a set of slice segments, with at least the first slice segment being an independent slice segment, the others, if any, being dependent slice segments. A slice segment contains an integer number of consecutive (in raster scan order) CTUs. The slice does not necessarily have a rectangular shape (it is thus less appropriate than tiles for spatial sub-part representations). A slice segment is encoded in the HEVC bit-stream as a slice_segment_header followed by slice_segment_data. Independent slice segments (ISS) and dependent slice segments (DSS) differ by their header: the dependent slice segment has a shorter header because reusing information from the independent slice segment's header. Both independent and dependent slice segments contain a list of entry points in the bit-stream.

When a video bit-stream is encoded with tiles, tiles can be motion-constrained to ensure that tiles do not depend from neighborhood tiles in the same picture (spatial dependency) and from neighborhood tiles in previous reference pictures (temporal dependency). Thus, motion-constrained tiles are independently decodable.

Alternatively, the projected image 122 or packed image 131 can be split by splitting means into several spatial sub-pictures before encoding, each sub-picture being encoded independently forming for instance an independent encoded HEVC bit-stream.

Alternatively, the region-wise packing means 130 and the splitting into several spatial sub-pictures by splitting means can operate simultaneously without generating in memory the complete intermediate packed image 131. The projected image 122 (or the resulting stereoscopic projected image after the optional region-wise packing) can be split into sub parts and each sub part can be directly packed into a spatial sub-picture to be encoded by encoding means 140.

Figure 10A:
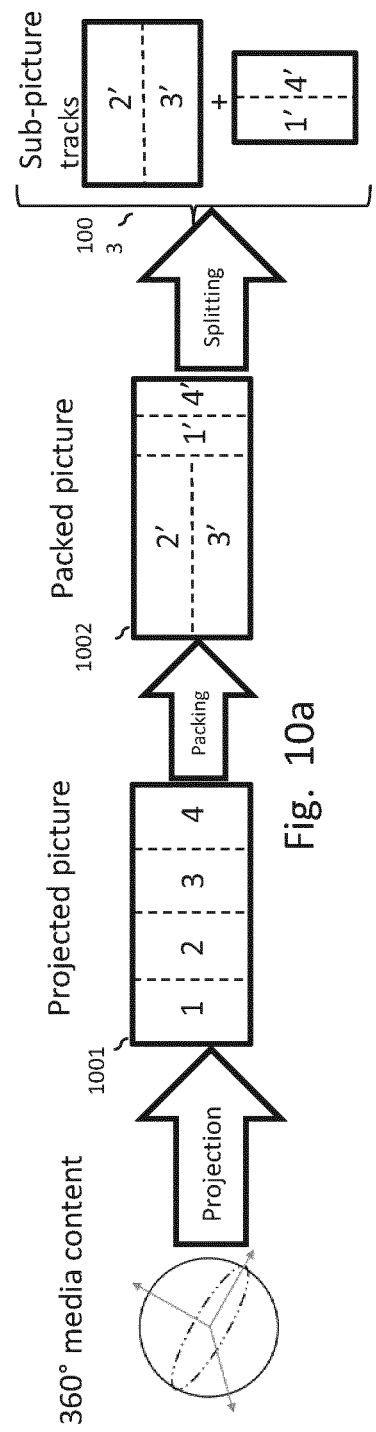
Figure 10B:
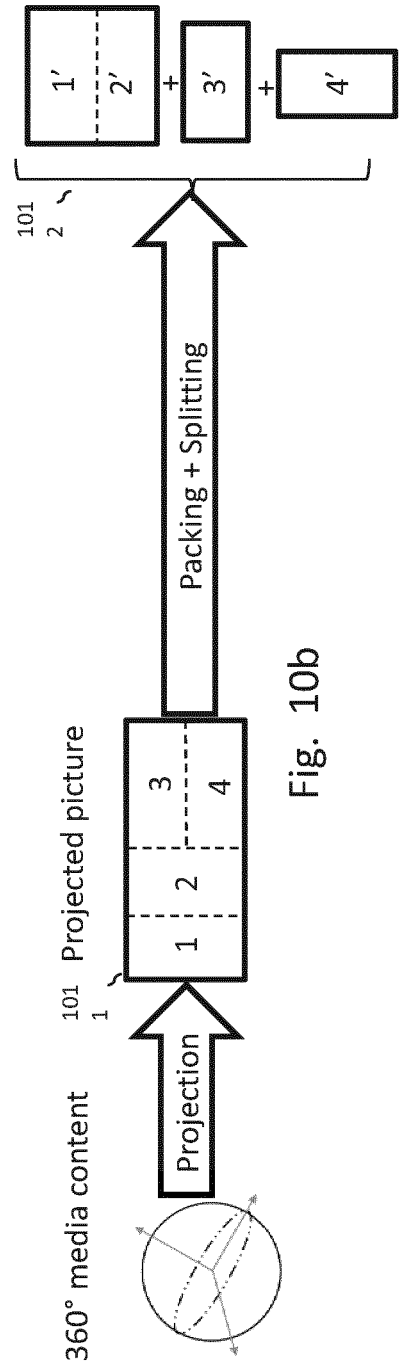

FIGS. 10*a*, 10*b*, 10*c* and 10*d* illustrate the several example of the overall process of projection, optional packing and splitting into sub-picture tracks implemented in means 125, 130 or 1012 for example, according to embodiments of the invention. One or more regions from the projected picture 1001 (noted 1, 2, 3 and 4) are rearranged into packed regions 1002 (noted 1', 2', 3' and 4') by applying several transform operations (identity, up or down scaling, rotation, mirroring, relocation . . . ) and then split and reorganized into one or more sub-picture tracks 1003. The splitting may also lead to one sub-picture track per packed region (1', 2', 3' or 4'). Packing and splitting operations may also be conducted at once, directly from the projected picture 1011 to one or more sub-picture tracks 1012. FIGS. 10*c* and 10*d* provide examples of different possible encapsulation in case the omnidirectional content is stereo content. In such case, the capturing step 110 uses a camera rig allowing stereoscopic recording, typically one video per eye.

FIG. 10*c* depicts an example of stereoscopic omnidirectional content where there is no frame packing (means 125 for the optional frame packing on FIG. 1). Then, each projected view 1021 is independently encapsulated, possibly into multiple sub-picture tracks like 1023 when region-wise packing is applied to each view (in 1022). In this example, there is one sub-picture track per region of each view. One could even decide to encapsulate both views of a same region in the same sub-picture track. Then the sub-picture track would contain a stereo video box at sample description level indicating the frame packing used.

FIG. 10*d* depicts an example of stereoscopic omnidirectional content where there is a frame packing (means 125 for the optional frame packing) applied in order to pack the two projected views 1031 in a single frame-packed picture 1032. Then, the resulting frame-packed picture 1032 is encapsulated, possibly into multiple sub-picture tracks like in 1033. In this example, each sub-picture track describes both views for a given spatial region. As for the projection followed by packing, one sub-picture track may encapsulate one region or many regions (as depicted on FIG. 10). An encapsulation module may decide on a description cost versus access granularity trade-off to encapsulate the content into sub-picture tracks containing multiple packed regions for example. This may be the case when the encapsulation by computing inverse projection of the packed region finds that there is no gap in the inverse projection of contiguous regions in the packed frame. This may be a decision criterion to group these regions from the packed picture into a single sub-picture track.

FIGS. 10a, 10b, 10c and 10d illustrates such gathering of several regions in a same sub-picture track. In case, the encapsulation module gathers multiple regions in a sub-picture track that generate gaps, holes or uncovered pixels in the projected picture, it may set the sub picture track positions and sizes equal to the positions and sizes of the bounding box of these multiple regions.

Therefore, as result of the encoding performed by the encoding means 140, the projected image 122 or packed image 131 can be represented by one or more independent encoded bit-streams or by at least one encoded bit-stream composed of one or more independently encoded sub-bit-streams.

Those encoded bit-streams and sub-bit-streams are then encapsulated by the encapsulating means 150 in a file or in small temporal segment files 165 according to an encapsulation file format, for instance according to ISO Base Media File Format and Omnidirectional MediA Format (OMAF—ISO/IEC 23090-2) as defined by the MPEG standardization organization. The resulting file or segment files can be mp4 file or mp4 segments. During the encapsulation, audio stream may be added to the video bit-stream as well as metadata tracks providing information on the video or on the audio streams.

The encapsulated file or segment files are then delivered to client 170 via a delivery mechanism 160, for example over Internet using http (HyperText Transfer Protocol) protocol or on a removable digital medium such as for example a disk. For the sake of illustration, the delivery 160 is performed using an adaptive streaming over HTTP such as DASH (Dynamic Adaptive Streaming over HTTP) from the MPEG standardization committee ("ISO/IEC 23009-1, Dynamic adaptive streaming over HTTP (DASH), Part1: Media presentation description and segment formats"). This standard enables association of a compact description of the media content of a media presentation with HTTP Uniform Resource Locations (URLs). Such an association is typically described in a file called a manifest file or a description file 164. In the context of DASH, this manifest file is an XML file also called the MPD file (Media Presentation Description).

By receiving an MPD file, a client device 170 gets the description of each media content component. Accordingly, it is aware of the kind of media content components proposed in the media presentation and knows the HTTP URLs to be used for downloading, via the streaming client 162, the associated media segments 165 from the streaming server 161. Therefore, the client 170 can decide which media content components to download (via HTTP requests) and to play (i.e. to decode and to play after reception of the media segments).

It is to be noted that the client device can only get media segments corresponding to a spatial part of full packed images representing a wide view of the scene depending on the user's viewport (i.e. part of the spherical video that is currently displayed and viewed by the user). The wide view of the scene may represent the full view represented by the full packed image.

Upon reception, the encapsulated virtual reality media file or media segments are parsed by the means 171 so as to extract one or more data streams that is/are decoded by the decoding means 172. In case of ISOBMFF file or segments received by the means 171, the parsing is typically handled by an mp4 reader or mp4 parser that, from the descriptive metadata, can extract encapsulated video bit-streams and/or video sub-bit-streams.

Next, optionally the packed images or packed sub-images provided to the means 173 the decoding means 172 are unpacked to obtain the projected images that are then processed for video rendering (rendering means 174) and displayed (displaying means 175).

Alternatively packed sub-images may be rearranged to compose intermediate full packed images before being unpacked into projected pictures.

It is to be noted that video rendering depends on several parameters among which is the point of view of the user, the point of sight, and the projection(s) used to create the projected images. As illustrated, rendering the video comprises a step of re-projecting on a sphere the decoded projected images. The images obtained from such a re-projection are displayed in the Head-Mounted display 176.

For handling stereoscopic views, the process described by reference to FIG. 1 may be duplicated or partially duplicated.

It has been observed that stitching several images of UHD (Ultra High Definition) video streams into panorama images of a virtual reality media data stream leads to a very high bitrate and very high resolution virtual reality media data stream. Therefore, from a system's perspective and to avoid wasting bandwidth and to remain compliant with processing capabilities of the client players, there is a need to optimize access to the virtual reality media data.

Such a need is even more important that a virtual reality media data stream may be used for other purposes than the one described by reference to FIG. 1. In particular, a virtual reality media data stream can be used for displaying 360° images with specific displays like a 360° array of projectors. It can also be used to display particular field of view and/or change the point of view, the field of view, and the point of sight.

According to particular embodiments, encoded bit-streams and sub-bit-streams resulting from the encoding of a packed image 131 (means 140 of FIG. 1) are encapsulated into a file or into small temporal segment files according to an encapsulation file format, for instance ISO Base Media File Format (ISO/IEC 14496-12 and ISO/IEC 14496-15), Omnidirectional MediA Format (OMAF) (ISO/IEC 23090-2) and associated specifications as defined by the MPEG standardization organization.

An encoded bit-stream (e.g. HEVC) and possibly its sub-bit-streams (e.g. tiled HEVC, MV-HEVC, scalable HEVC), can be encapsulated as one single track. Alternatively multiple encoded bit-streams that are spatially related (i.e. are sub-spatial parts of a projected image) can be encapsulated as several sub-picture tracks. Alternatively, an encoded bit-stream (e.g. tiled HEVC, MV-HEVC, scalable HEVC) comprising several sub-bit-streams (tiles, views, layers) can be encapsulated as multiple sub-picture tracks.

A sub-picture track is a track embedding data for a sub-part, typically a spatial part or rectangular region, of a picture or image. A sub-picture track may be related to other sub-picture tracks or to the track describing the full picture the sub-picture is extracted from. For example a sub-picture track can be a tile track. It can be represented by an AVC track, an HEVC track, an HEVC tile track or any compressed video bit-stream encapsulated as a sequence of samples.

A tile track is a sequence of timed video samples corresponding to a spatial part of an image or to a sub-picture of an image or picture. It can be for example a region of interest in an image or an arbitrary region in the image. The data corresponding to a tile track can come from a video bit-stream or can come from a sub part of a video bit-stream. For example a tile track can be an AVC or HEVC compliant bit-stream or can be a sub-part of AVC or HEVC or any encoded bit-stream, like for example HEVC tiles. In a preferred embodiment, a tile track is independently decodable (encoder took care to remove motion prediction from other tiles by generating "motion-constrained" tiles). When tile track corresponds to a video bit-stream encoded in HEVC with tiles, it can be encapsulated into an HEVC Tile track denoted as 'hvt1' track as described in ISO/IEC 14496-15 4th edition. It can then refer to a tile base track to obtain parameter sets, high level information to set up the video decoder. It can also be encapsulated into a HEVC track 'hvc1' or 'hev2' track. A tile track can be used for spatial composition of sub-pictures into a bigger image or picture.

A tile base track is a track common to one or more tile tracks that contain data or metadata that is shared among these one or more tracks. A tile base track may contain instructions to compose images from one or more tile tracks. Tile tracks may depend on a tile base track for complete decoding or rendering. When tile base track derives from a video bit-stream encoded in HEVC with tiles, it is encapsulated into an HEVC track denoted as 'hvc2' or 'hev2' track. In addition it is referenced by HEVC tile tracks via a track reference 'tbas' and it shall indicate the tile ordering using a 'sabt' track reference to the HEVC tile tracks as described in ISO/IEC 14496-15 4th edition.

A composite track (also denoted reference track) is a track that refers to other tracks to compose an image. One example of composite track is, in case of video tracks, a track composing sub-picture tracks into a bigger image. This can be done by post-decoding operation, for example in a track deriving from video tracks that provides transformation and transformation parameters to compose the images from each video track to a bigger image. A composite track can also be a track with extractor NAL units providing instructions to extract NAL units from other video tracks or tile tracks to form before decoding a bit-stream resulting from sub-bit-stream concatenation. A composite track can also be a track that implicitly provides composition instructions, for example through track references to other tracks. A composite track may help the rendering performed by rendering means 174 for spatial composition of sub-picture tracks by providing bitstream concatenation or sample reconstruction rules. The bitstream concatenation or sample reconstruction rules may be defined for each sample, for example using one or more extractor NAL units or they may be defined at track level, for example via track references like in tile base track.

ISO/IEC 14496-12 provides a box denoted 'trgr' located at track level (i.e. within the 'trak' box in ISOBMFF box hierarchy) to describe groups of tracks, where each group shares a particular characteristic or where the tracks within a group have a particular relationship. This track group box is an empty container defined as follows:
Box Type: 'trgr'
Container: TrackBox ('trak')
Mandatory: No
Quantity: Zero or one

```
aligned(8) class TrackGroupBox extends Box('trgr') {
}
```

This track group box can contain a set of track group type boxes defined as follows:

```
aligned(8) class TrackGroupTypeBox(unsigned int(32) track_group_type)
    extends FullBox(track_group_type, version = 0, flags = 0)
{
    unsigned int(32) track_group_id;
    // the remaining data may be specified for a particular
track_group_type
}
```

The particular characteristic or the relationship declared by an instance of this track group type box is indicated by the box type (track_group_type). This box also includes an identifier (track_group_id), which can be used to determine the tracks belonging to the same track group. All the tracks having a track group box with a track group type box having the same track_group_type and track_group_id values are part of the same track group. The box also allows declaration of specific parameters associated with the track for a particular track group type.

The MPEG ISOBMFF standard (ISO/IEC 14496-12 $7^{th}$ edition Amendment 1—May 2018) is proposing a specific track group SpatialRelationship2DDescriptionBox for two dimensional spatial relationship as a TrackGroupTypeBox of type '2dcc'.

SpatialRelationship2DDescription Box TrackGroupTypeBox with track_group_type equal to '2dcc' indicates that this track belongs to a group of tracks with 2D spatial relationships (e.g. corresponding to planar spatial parts of a video source). A SpatialRelationship2DDescriptionBox TrackGroupTypeBox with a given track_group_id implicitly defines a coordinate system with an arbitrary origin (0, 0) and a maximum size defined by total_width and total_height; the x-axis is oriented from left to right and the y-axis from top to bottom. The tracks that have the same value of source_id within a SpatialRelationship2DDescriptionBox TrackGroupTypeBox are mapped as being originated from the same source and their associated coordinate systems share the same origin (0, 0) and the orientation of their axes. When only one track group for 2D spatial relationship is present in a file, the source_id parameter is optional. A source or video source corresponds to the content being captured by a camera or a set of cameras for omnidirectional content. For example, a very high-resolution video could have been split into sub-picture tracks. Each sub-picture track then conveys its position and sizes in the source video.

The two dimensional spatial relationship track group of type '2dcc' is defined as below:

```
aligned(8) class SpatialRelationship2DSourceBox
    extends FullBox('2dsr', 0, 0) {
    unsigned int(32) total_width;
    unsigned int(32) total_height;
    unsigned int(32) source_id;
}
aligned(8) class SubPictureRegionBox extends FullBox('sprg',0,0) {
    unsigned int(16) object_x;
    unsigned int(16) object_y;
```

```
    unsigned int(16) object_width;
    unsigned int(16) object_height;
}
aligned(8) class SpatialRelationship2DDescriptionBox extends
TrackGroupTypeBox('2dcc')
{
    // track_group_id is inherited from TrackGroupTypeBox;
    SpatialRelationship2DSourceBox( );    // mandatory, must be first
    SubPictureRegionBox ( );    // optional
}
``` where object_x specifies the horizontal position of the top-left corner of the track within the region specified by the enclosing track group. The position value is the value prior to applying the implicit resampling caused by the track width and height, if any, in the range of 0 to total_width−1, inclusive, where total_width is defined by the enclosing track group, object_y specifies the vertical position of the top-left corner of the track within the region specified by the enclosing track group. The position value is the value prior to applying the implicit resampling caused by the track width and height, if any, in the range of 0 to total_height−1, inclusive, where total_height is defined by the enclosing track group, object_width specifies the width of the track within the region specified by the enclosing track group. The position value is the value prior to applying the implicit resampling caused by the track width and height, if any, in the range of 1 to total_width, inclusive, where total_width is defined by the enclosing track group, object_height specifies the height of the track within the region specified by the enclosing track group. The position value is the value prior to applying the implicit resampling caused by the track width and height, if any, in the range of 1 to total_height, inclusive, where total_height is defined by the enclosing track group, total_width specifies, in pixel units, the maximum width in the coordinate system of the 'srd' track group. The value of total_width shall be the same in all instances of SpatialRelationshipDescriptionBox with the same value of track_group_id, total_height specifies, in pixel units, the maximum height in the coordinate system of the 'srd' track group. The value of total_height shall be the same in all instances of SpatialRelationshipDescriptionBox with the same value of track_group_id, and source_id is an optional parameter providing a unique identifier for the source. It implicitly defines a coordinate system associated to this source.

SubPictureRegionBox( ) is an optional box providing the static positions and sizes of the track within the region specified by the enclosing track group.

If SubPictureRegionBox( ) is present in the SpatialRelationship2DDescriptionBox, then there shall be no associated SpatialRelationship2DGroupEntry in the associated track (this track has a constant, static, size and position).

If SubPictureRegionBox( ) is not present in the SpatialRelationship2DDescriptionBox, then there shall be one or more associated SpatialRelationship2DGroup Entry(s) in the associated track (this track possibly has a dynamic size and/or position).

The SpatialRelationship2DGroupEntry( )defining the '2dcc' sample grouping allows declaring the positions and sizes of the samples from a sub-picture track in a two dimensional spatial relationship track group. Version 1 of the SampleToGroupBox shall be used when grouping_type is equal to '2dcc'. The value of grouping_type_parameter shall be equal to track_group_id of the corresponding spatial relationship track group.

The SpatialRelationship2DGroupEntry( ) is defined as follows:

```
class SpatialRelationship2DGroupEntry ( ) extends
VisualSampleGroupEntry ('2dcc') {
    unsigned int(16) object_x;
    unsigned int(16) object_y;
    unsigned int(16) object_width;
    unsigned int(16) object_height;
}
``` where object_x specifies the horizontal position of the top-left corner of the samples in this group within the coordinate system specified by the corresponding spatial relationship track group. The position value is the value prior to applying the implicit resampling caused by the track width and height, if any, in the range of 0 to total_width−1, inclusive, where total_width is included in the corresponding SpatialRelationship2DDescriptionBox, object_y specifies the vertical position of the top-left corner of the samples in this group within the coordinate system specified by the corresponding spatial relationship track group. The position value is the value prior to applying the implicit resampling caused by the track width and height, if any, in the range of 0 to total_height−1, inclusive, where total_height is included in the corresponding SpatialRelationship2DDescriptionBox, object_width specifies the width of the samples in this group within the coordinate system specified by the corresponding spatial relationship track group. The position value is the value prior to applying the implicit resampling caused by the track width and height, if any, in the range of 1 to total_width, inclusive, and object_height specifies the height of the samples in this group within the coordinate system specified by the corresponding spatial relationship track group. The position value is the value prior to applying the implicit resampling caused by the track width and height, if any, in the range of 1 to total_height, inclusive.

The samples of each track in a '2dcc' track group can be spatially composed with samples (at the same composition or decoding time) from other tracks in this same group to produce a bigger image.

Depending on encoded bit-streams and sub-bit-streams resulting from the encoding of a packed image 131 (step 140 of FIG. 1), several variants of encapsulation in file format are possible.

Figure 2A:
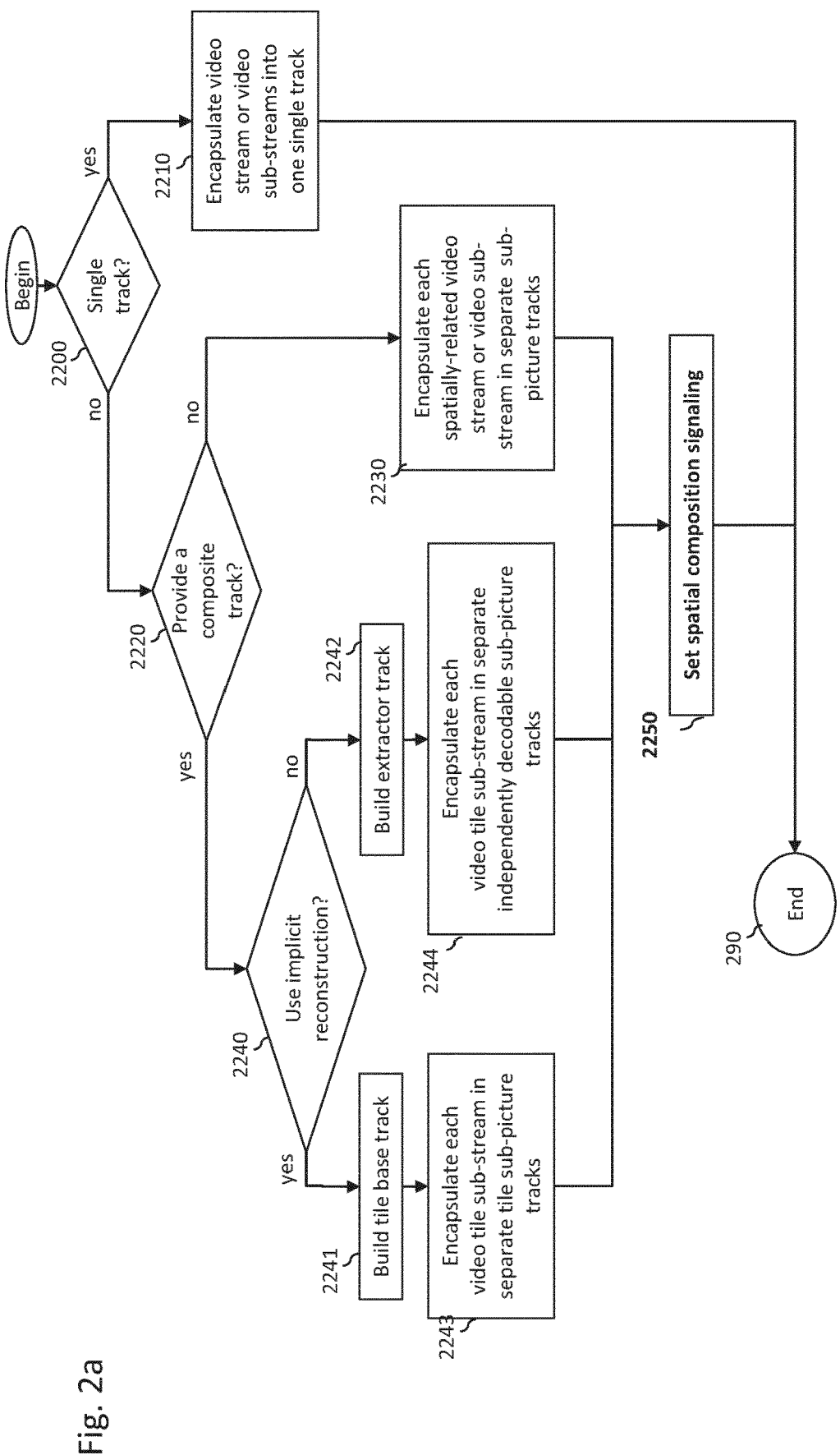
FIGS. 2a and 2b represent block diagrams illustrating examples of encapsulation according to embodiments of the invention.
Figure 2B:
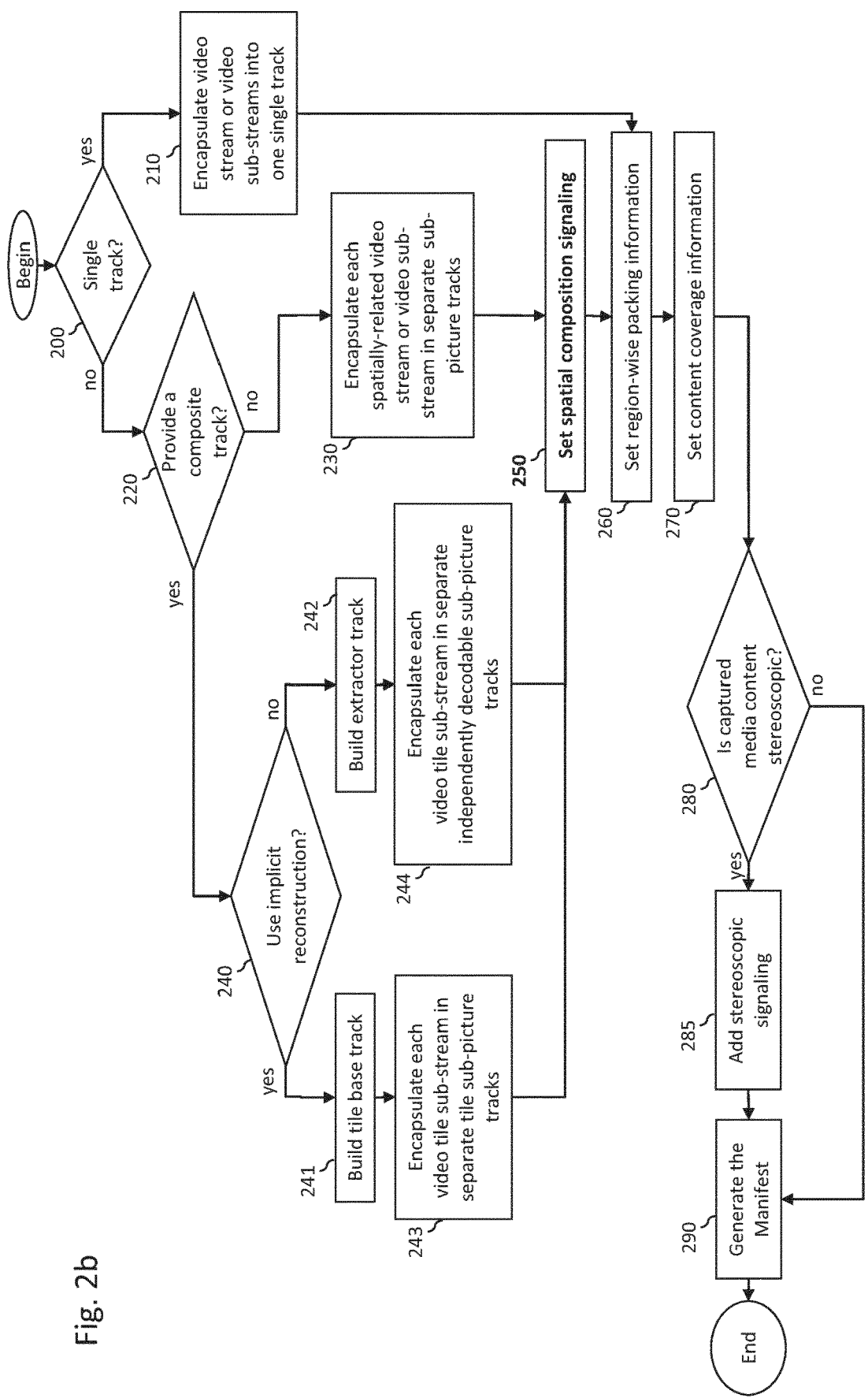

FIGS. 2a and 2b represents block diagrams illustrating examples of file/segment encapsulation (implemented in means 150 of FIG. 1) according to an embodiment of the invention.

FIG. 2a illustrates steps for encapsulating (by means 150) of 2D video into multiple tracks. At step 2200, the server determines whether the input bitstream(s) after encoding, are to be encapsulated as a single or multiple tracks. If single track encapsulation is on, the video is encapsulated as a single track, optionally with a NAL unit mapping indicating which NAL units correspond to which region. If multiple tracks have to be generated (test 2200 'true'), for example when a split s performed by means 1122 in FIG. 1a, then in step 2220, the content creator of the files may add a composite track. A composite track allows providing an entry point or a "main" or "default" track for the parsers or players. For example, the composite track has the flags values set in the track header indicating that it is enable and that it is used in movie and optionally as preview. The tracks referenced by the composite tracks may not have these flags value set (except the track_enable flags value) to hide these track from selection by clients or players or users. When there is no composite track, the media file and each bitstream or sub-bitstream after encoding is encapsulated in its own track in step 2230. An optional step may consist in reducing the number of tracks by gathering bitstreams or sub-bitstreams to form bigger regions than the original split ones. When the encapsulation provides a composite track (test 2220 is 'true'), two options are possible for a sample reconstruction rule: implicit or explicit reconstruction indication in the media file.

For implicit reconstruction (test 2240 is 'true', branch 'yes'), the composite track is provided as a tile base track (e.g. tracks with 'hyt1' sample entry) as defined by ISO/IEC 14496-15 in step 2241. Then each sub-picture track is encapsulated as a tile track depending on this tile base track in step 2243, as specified in ISO/IEC 14496-15. Note that in addition to the 'trif' descriptor for tile tracks, each tile track may also be declared as part of a same track group for 2D spatial relationship description.

If the composite track is provided as a track with extractor for explicit reconstruction (test 2240 is 'false', branch 'no'), an additional track is created in the media file. This created track references each sub-picture track created in step 2444, for example with a 'scal' track reference type. If no composite track is provided (test 2220 is 'false', branch 'no'), then the video part of the media is encapsulatedas sub-picture tracks in a step 2230. Note that even if a composite track is present, the sub-picture track may also be grouped vie the track group mechanism.

Finally, the description for spatial composition and the relationship between the sub-picture tracks is generated at step 2250. A track group box for 2D spatial relationship description is added to each sub-picture track to describe the relative positions and sizes of each sub-picture track within the original video source.

According to an embodiment of the invention, additional spatial information may be provided. This additional information may be additional signaling as described more in detail by reference to FIGS. 12 and 13.

The additional information will allow the media parsers or media players to reconstruct the video to display (displaying means in FIGS. 1*a* and *b*).

In an alternative, if no additional information is provided in step 2250, the parser may infer the information from other data in the bitstream.

FIG. 2*b*: at step 200, the server determines if there are several spatially-related video bit-streams (i.e. representing spatial sub-part of packed images and for which a spatial composition may create a bigger image) or if there are video bit-streams comprising video sub-bit-streams representing either motion-constrained tiles or multiple views that can be exposed to the client as multiple sub-picture tracks. If the encoded packed image cannot be exposed as multiple tracks because it is encoded as a single video bit-stream or the content creator does not wish to expose the encoded packed image as multiple tracks, then video bit-stream or video sub-bit-streams are encapsulated into one single track (step 210). Otherwise, it is determined at step 220 if the media content to be encapsulated is composed of video sub-bit-streams representing motion-constrained tiles. If yes, at least one composite track may need to be provided to represent at least one composition of several tile tracks. The composition may represent the full packed images or only a sub-part of the full packed images. Using a composite track with tile tracks avoids requiring separate rendering and decoding of streams on the client-side. The number of possible combinations to be exposed to the client depends on content creator's choices. For instance, the content creator may want to combine tiles with different visual qualities depending on current user's viewport. For this, it can encode several times a packed image with different visual qualities and propose several composite tracks representing the full packed image comprising different combination of tiles in terms of visual qualities. By combining tiles at different qualities depending on user's viewport, the content creator can reduce the consumption of network resources.

If at step 220, it is determined that composite tracks must be provided, it is then determined if implicit reconstruction can be used or not for the composite track (step 240).

Implicit reconstruction refers to bit-stream reconstruction from tile base and tile tracks, for instance as defined in ISO/IEC 14496-15 4th edition. Rather than using in-stream structure such as extractors to re-build samples of a composite track from samples of tile tracks by replacing extractors in composite track's samples by the data they reference in tile tracks' samples, implicit reconstruction allows re-building composite track's samples by concatenating samples of the composite track and tile tracks in the order of track references (e.g. 'sabt' track references in HEVC implicit reconstruction).

The use of implicit reconstruction depends on the scenario of use. When the composition of several tile tracks requires a rearrangement of the tiles at the decoding compared to the order of tiles at the encoding, then some slice addresses must be rewritten. In such a case, implicit reconstruction is not possible and explicit reconstruction with extractors must be selected.

If implicit reconstruction is possible, a tile base track is generated (step 241), and the video sub-bit-streams are encapsulated as tile tracks not decodable independently (e.g. as HEVC 'hvt1' tracks).

Otherwise an extractor track is generated (step 242), and the video sub-bit-streams are encapsulated as tile tracks decodable independently (e.g. as HEVC 'hvc1' or 'hev1' tracks).

Going back to step 220, if the media content does not contain tile sub-bit-streams or the content creator does not want to create and expose composite tracks, then spatially-related video bit-streams or video sub-bit-streams (e.g. tile or multiple views) are encapsulated into separate sub-picture tracks (step 230). In such particular case, if the tile sub-bit-streams are HEVC tiles, they are encapsulated as HEVC track 'hvc1' or 'hev1' track.

At step 250, signaling for spatial composition is added to group together spatially-related video bit-streams or video sub-bit-streams. Spatial composition signaling can be provided by defining a specific TrackGroupTypeBox in each track (sub-picture tracks, tile tracks, composite tracks) that composes the group, for instance a track group of type '2dcc' with same track_group_id for all tracks pertaining to the same group as defined in MPEG ISOBMFF (ISO/IEC 14496-12 $7^{1h}$ edition Amendment 1) as previously described.

This track group box '2dcc' would provide the relative two-dimensional coordinates of the track within the composition and the overall size of the image formed by the composition. The composition may represent entire packed images or only a sub-part of packed images. For instance, the content creator may want to expose multiple composite tracks allowing building the entire packed images or only sub-part of packed images.

Alternatively, the composition may represent entire projected images or only a sub-part of projected images.

Parameters from '2dcc' track group (track_group_id, source_id, total_width, total_height, object_x, object_y, object_width, object_height) directly match the parameters of the DASH Spatial-Relationship Description (SRD) descriptor (defined in ISO/IEC 23009-1 $3^{rd}$ edition) that can be used in a DASH manifest to describe the spatial relationship of Adaptation Sets representing those tracks:

track_group_id would match the DASH SRD spatial_set_id parameter, source_id would match the DASH SRD source_id parameter (when not present, the default value "1" may be used, since mandatory in DASH SRD), object_x, object_y, object_width, object_height would match the DASH SRD parameters object_x, object_y, object_width, object_height parameters respectively, and total_width and total_height from the associated track group (via the track_group_id) would match the DASH SRD total_width, total_height parameters.

As an alternative, in case there is a composite track, spatial composition signaling can be provided implicitly by this composite track. Indeed, in case the composite track is a tile base track, the tile base track refers to a set of tile tracks via a track reference of type 'sabt'. This tile base track and set of tile tracks forms a composition group. Similarly, if the composite track is an extractor track, the extractor track refers to a set of tile tracks via a track reference of type 'scal'. This extractor track and set of tile tracks also forms a composition group. In both cases, relative two-dimensional coordinates of each tile track within the composition can be provided by defining a sample grouping or default sample grouping of type 'trif' as defined in ISO/IEC 14496-15 $4^{th}$ edition.

As another alternative, spatial composition signaling can be provided by defining a new entity group. An entity group is a grouping of items or tracks. Entity groups are indicated in a GroupsListBox in a MetaBox. Entity groups referring to tracks may be specified in GroupsListBox of a file-level MetaBox or in GroupsListBox of a movie-level MetaBox. The GroupListBox ('grpl') contains a set of full boxes, each called an EntityToGroupBox, with an associated four-character codes denoting a defined grouping type. The EntityToGroupBox is defined as follows:

```
aligned(8) class EntityToGroupBox(grouping_type, version, flags)
extends FullBox(grouping_type, version, flags) {
    unsigned int(32) group_id;
    unsigned int(32) num_entities_in_group;
    for(i=0; i<num_entities_in_group; i++)
        unsigned int(32) entity_id;
    // the remaining data may be specified for a particular
    grouping_type
}
```

Typically group_id provides the id of the group and the set of entity_id provides the track_ID of the tracks that pertains to the entity group. Following the set of entity_id, it is possible to extend the definition of the EntityToGroupBox by defining additional data for a particular grouping_type. According to an embodiment, a new EntityToGroupBox with for instance grouping_type equal to 'egco' (for Entity Group Composition) can be defined to describe the composition of two dimensional spatially-related video bit-streams or video sub-bit-streams. The set of entity_id would contains the set of track_ID of tracks (sub-pictures, tile tracks, composite tracks) that composes a group. The overall size of the image formed by the composition can be provided as part of additional data associated to this new grouping_type 'egco'.

EntityToGroupBox('egco') would be defined as follows:

```
aligned(8) class EntityToGroupBox('egco', version, flags)
extends FullBox('egco', version, flags) {
    unsigned int(32) group_id;
    unsigned int(32) num_entities_in_group;
    for(i=0; i<num_entities_in_group; i++)
        unsigned int(32) entity_id;
    unsigned int(16) total_width;
    unsigned int(16) total_height;
    unsigned int(32) source_id;
}
``` where total_width and total_height provide the size of the composition and the optional source_id parameter provides a unique identifier for the source and implicitly defines a coordinate system (i.e., an origin (0, 0) and the orientation of their axes) associated to the source.

Compared with DASH, group_id would match the DASH SRD spatial_set_id parameter, source_id would match the DASH SRD source_id parameter, and total_width and total_height would match the DASH SRD total_width and total_height parameters, respectively. When source_id is not present in the EntityToGroupBox for composition, the default value "1" is used to map to DASH MPD. In case the MPD describes multiple media content, then it is up to the MPD generator to handle and allocate source_id values that allow distinguishing one media content from another media content.

The relative two-dimensional coordinates of each track within the composition defined by an entity grouping of type 'egco' can be provided by defining a track group of type ('egco') as defined below:

```
aligned(8) class SubPictureRegionBox extends FullBox('sprg',0,0) {
    unsigned int(16) object_x;
    unsigned int(16) object_y;
    unsigned int(16) object_width;
    unsigned int(16) object_height;
}
aligned(8) class SpatialRelationship2DDescriptionBox extends
TrackGroupTypeBox('2dcc')
{
    // track_group_id is inherited from TrackGroupTypeBox;
    SubPictureRegionBox ( );
}
``` where object_x, object_y, object_width, and object_height provide the relative two-dimensional coordinates of each track in the composition.

A given EntityToGroupBox of type 'egco' is associated with the corresponding SpatialRelationship2DDescriptionBox by defining a group_id equals to track_group_id.

Alternatively, the relative two-dimensional coordinates of each track within the composition defined by an entity grouping of type 'egco' can be provided by defining a sample grouping or default sample grouping of type 'trif' in each tile track as defined in ISO/IEC 14496-15 $4^{th}$ edition. As an alternative, relative two-dimensional coordinates can be defined as a new generic full box 2DCoordinateForEntityGroupBox('2dco') that would be located in VisualSampleEntry in each tile track pertaining to a group:

```
aligned(8) class 2DCoordinateForEntityGroupBox extends FullBox('2dco',
version, flags)
{
    unsigned int(32) entity_group_id;
    unsigned int(16) object_x;
    unsigned int(16) object_y;
    unsigned int(16) object_width;
    unsigned int(16) object_height;
}
``` where entity_group_id provides the identifier of the associated EntityToGroupBox('egco') defining the group, object_x and object_y provide the horizontal and vertical position of the top-left corner of samples of this track within the composition, and object_width and object_height provide the width and height of the samples of this track within the composition.

As an alternative, this new generic box 2DCoordinateForEntityGroupBox('2dco') can be defined as a new sample grouping as follows:

```
class 2DCoordinateForEntityGroupBox extends
VisualSampleGroupEntry('2dco')
{
    unsigned int(32) entity_group_id;
    unsigned int(16) object_x;
    unsigned int(16) object_y;
    unsigned int(16) object_width;
    unsigned int(16) object_height;
}
```

Turning back to FIG. 2b, region-wise packing information for the track is added to the metadata describing the encapsulation of video bit-streams or video sub-bit-streams, at step 260. This step is optional when the sub-picture track is not further rearranged into regions.

Region-wise packing provides information for remapping of a luma sample location in a packed region onto a luma sample location of the corresponding projected region. In MPEG OMAF, region-wise packing may be described according to following data structure:

```
aligned(8) class RegionWisePackingStruct( ) {
    unsigned int(1) constituent_picture_matching_flag;
    bit(7) reserved = 0;
    unsigned int(8) num_regions;
    unsigned int(32) proj_picture_width;
    unsigned int(32) proj_picture_height;
    unsigned int(16) packed_picture_width;
    unsigned int(16) packed_picture_height;
    for (i =0; i < num_regions; i++) {
        bit(3) reserved = 0;
        unsigned int(1) guard_band_flag[i];
        unsigned int(4) packing_type[i];
        if (packing_type[i] == 0) {
            RectRegionPacking(i);
            if (guard_band_flag[i])
                GuardBand(i);
        }
    }
}
``` where proj_picture_width and proj_picture_height specify the width and height, respectively, of the projected picture, in relative projected picture sample units, packed_picture_width and packed_picture_height specify the width and height, respectively, of the packed picture, in relative packed picture sample units, num_regions specifies the number of packed regions when constituent_picture_matching_flag is equal to 0. When constituent_picture_matching_flag is equal to 1, the total number of packed regions is equal to 2*num_regions and the information in RectRegionPacking(i) and GuardBand(i) applies to each stereo constituent picture of the projected picture and the packed picture, RectRegionPacking(i) specifies the region-wise packing between the i-th packed region and the i-th projected region (i.e. convert x, y, width, height coordinates from packed region to projected region with optional transforms (rotation, mirroring)), and GuardBand(i) specifies the guard bands, if any, for the i-th packed region.

According to embodiments of the invention, when region-wise packing information is defined in a sub-picture track, this structure only describes the packing of the sub-picture track by reference to the complete projected picture. Thus packed_picture_width and packed_picture_height are equals to sub-picture track's width and height.

Optionally at step 270, content coverage information for the track and for compositions of tracks is added to the metadata describing the encapsulation of video bit-streams or video sub-bit-streams. This step is optional and uses the CoverageInformationBox as defined in ISO/IEC 23090-2

For omnidirectional video, the CoverageInformationBox provides information on the area on the sphere covered by the content. The nature of the content depends on the Container of this box. When present in a SpatialRelationship2DDescriptionBox '2dcc', the content refers to the entire content represented by all tracks belonging to the same sub-picture composition track group and a composition picture composed from these tracks is referred to as a packed picture of the entire content. When present in a sample entry of a track, the content refers to the content represented by this track itself, and the picture of a sample in this track is referred to as a packed picture of the entire content. When no CoverageInformation Box is present for a track, it indicates that the content covers the entire sphere.

It is to be noted that for omnidirectional video, the Projected omnidirectional video box ('povd') is an intermediate box defined by MPEG OMAF and located into a VisualSampleEntry in a track.

In addition, for omnidirectional video, the SpatialRelationship2DDescriptionBox track group box ('2dcc') may be extended as follows:

```
aligned(8) class SpatialRelationship2DDescriptionBox extends
TrackGroupTypeBox('2dcc')
{
    // track_group_id is inherited from TrackGroupTypeBox;
    SpatialRelationship2DSourceBox( );      // mandatory, must be first
    SubPictureRegionBox ( );                // optional
    CoverageInformationBox( );              // optional
}
```

As a second embodiment, track coverage information and composition coverage information can be signaled using a single common CoverageInformationBox with a flag value to distinguish local and global indication. Since CoverageInformationBox is an ISOBMFF FullBox, the distinction between track and global coverage can be expressed through the flags parameter of the box.

According to this second embodiment, the CoverageInformation Box is defined as follows:

Box Type: 'covi'
Container: Projected omnidirectional video box ('povd')
Mandatory: No
Quantity: Zero or more

```
aligned(8) class CoverageInformationBox extends FullBox('covi', 0, 0)
{
    ContentCoverageStruct( )
}
```

The structure of the box is almost the same as in previous embodiment except that multiple instances of the box can be defined in case local and composition coverage information must be defined in a same track.

The CoverageInformation Box is then defined as providing information on the area on the sphere covered by the content. The nature of the content is given by the flags parameter. The default value for the Coverage Information flags is 0, meaning that this box describes the coverage of the entire content. If this track belongs to a two dimensional spatial relationship track group, the entire content refers to the content represented by all tracks belonging to the same two dimensional spatial relationship track group, and a composition picture composed from these tracks is referred to as a packed or projected picture of the entire content. Otherwise, the entire content refers to the content represented by this track itself, and the picture of a sample in this track is referred to as a packed or projected picture of the entire content.

When the value for the Coverage Information flags is 1, this box describes the spherical area covered by the packed or projected pictures of the content represented by this track.

The absence of this box indicates that the content covers the entire sphere.

In addition, a new flag value is defined as follows:

Coverage_local: Indicates that the coverage information is local to the track containing the box. Flag value is 0x000001. By default, this value is not set.

Going back to FIG. 2b, at step 280, it is checked if the virtual reality media content is actually stereoscopic virtual reality media content, i.e. comprises left and right views.

If the content is only monoscopic, the process directly goes to step 290.

If the content is stereoscopic, stereoscopic signalling is added to the encapsulation at step 285.

For stereoscopic content, classically, both left and right view sequences are acquired from a stereoscopic camera and are composited into a video sequence or two video sequences according to a composition type.

The process to combine two frames representing two different views of a stereoscopic content into one single frame is called frame packing (see step 125 in FIG. 1).

Frame packing consists in packing two views that form a stereo pair into a single frame. There exists several well-known and used frame packing schemes: side by side, top-bottom, frame sequential, vertical line interleaved type . . . . For example, the MPEG application format ISO/IEC 23000-11 $1^{st}$ edition ("Stereoscopic video application Format") or ISO/IEC 23001-8 $2^{nd}$ edition ("Coding-independent code-points (CICP)") defines some of these schemes. Frame packing can also consist in keeping each view in separate frames like for example the VideoFramePackingType having the value 6 defined in ISO/IEC 23001-8 $2^{nd}$ edition ("CICP").

For instance, still according to this specification, the value 3 signals that each decoded frame contains a side-by-side packing arrangement of corresponding frames of two constituent views, the value 4 signals that each decoded frame contains a top-bottom packing arrangement of corresponding frames of two constituent views.

In order to signal if a track contains stereoscopic media data, a StereoVideoBox is defined in VisualSampleEntry in the track.

Turning back to step 250 of FIG. 2, the SpatialRelationship2DDescriptionBox is defined to match the definition of the Spatial Relationship Descriptor 'SRD' as defined in Dynamic Adaptive Streaming over HTTP (DASH) protocol (ISO/IEC 23009-1 3rd edition) to express spatial relationships between video tracks as provided in the Table below:

| ISOBMFF parameter | DASH SRD parameter |
| --- | --- |
| trgr::'2dcc'::track_group_id | spatial_set_id |
| trgr::'2dcc'::'sprg'::object_x | object_x |
| trgr::'2dcc'::'sprg'::object_y | object_y |
| trgr::'2dcc'::'sprg'::object_width | object_width |
| trgr::'2dcc'::'sprg'::object_height | object_height |
| trgr::'2dcc'::'2dsr'::total_width | total_width |
| trgr::'2dcc'::'2dsr'::total_height | total_height |
| trgr::'2dcc'::'2dsr'::source_id (when present) | source_id (when present) |

A TrackGroupTypeBox with '2dcc' track_grouping_type indicates that the track belongs to a group of tracks corresponding to spatial parts of a video. The tracks that have the same value of source_id within a TrackGroupTypeBox of track_group_type '2dcc' are mapped as being originated from the same source (i.e. with same origin (0, 0), and same orientation of their axes). More precisely, the complete composition pictures (with size total width and total_height) from two track groups with same source_id are perceptually or visually equivalent (e.g. two composition pictures representing the same visual content at two different resolutions or two different qualities). Adding a source_id parameter allows expressing whether two sets of sub-picture tracks are sharing a common referential (same source_id value) or not (different source_id values). The indication that two sets of sub-picture tracks share a same referential may be interpreted as a possibility to combine the sub-picture tracks from different sets for rendering (but this is let to the application: the ISOBMFF parser from the indication in the encapsulated file can inform the application about the possible alternatives). The absence of the source_id parameter in the description of the track group for 2D spatial relationship indicates that the relative positions between the two sets of sub-picture tracks are unknown or unspecified.

All sub-picture tracks belonging to a TrackGroupType-Box with '2dcc' track_grouping_type and same track_group_id shall have the same source_id, when present.

Tracks belonging to a TrackGroupTypeBox with '2dcc' track_grouping_type and different track_group_id are compatible and can be combined together if they have the same source_id. When source_id is present, tracks belonging to a TrackGroupTypeBox with '2dcc' track_grouping_type and different track_group_id are not compatible and cannot be combined together if they have a different value for their source_id When source_id parameter is not present in the description of a TrackGroupTypeBox with '2dcc' track_grouping_type, this does not imply that sub-picture tracks from different track groups with '2dcc' track_grouping_type cannot be combined. There may be alternative to indicate such possibility for combination. For instance, in the case of omnidirectional video, two sub-picture tracks do not represent sub parts of the same source when the two-dimensional projected picture representing this source are not visually equivalent (e.g. they have different projection format or different viewport orientations). In such case, they may be signalled with a different value of source_id in their respective description of track group for 2D spatial relationships.

As an alternative, this later rule applies even if it exists an alternate group grouping sub-picture tracks from '2dcc' track group with different source_id. That means those sub-pictures track are alternatives (for instance they have different coding format, e.g. AVC and HEVC) but they are not intended to be combined with sub-picture tracks with different coding format.

When media content is split into sub-parts to encode and to encapsulate individually, the resulting sub-picture tracks may benefit from additional descriptive information as explained by reference to steps 2250 or 250 in FIG. 2a or 2b.

Indeed, from content generation point of view, splitting the content into spatial sub-parts provides adaptation to client's display or processing capabilities. As such, the media may be provided as alternative sets of sub-picture tracks covering more or less the captured image 1011 or 122. For example, server may encapsulate the sub-picture tracks with information indicating whether the set of sub-picture tracks belonging to one track group, covers or not the whole source image.

Moreover, when the whole source image is covered, it is advantageous to know whether the set of sub-picture tracks exactly cover the whole source image, or whether there are some overlaps. On the contrary, it is advantageous to know if the whole source image is not covered. In this case, it is advantageous to know which part is exactly covered and whether there are holes and where they are located.

Said information allows a client exploring the media file or a media description file to retrieve the missing parts.

Having such information at client side helps the player to select the best of sub-picture tracks according to their capacities or the application needs or to user choices.

A first aspect of the invention then proposes to improve the track groups for 2D spatial relationship description with indication about the set of sub-picture tracks with respect to the source image.

Figure 11:
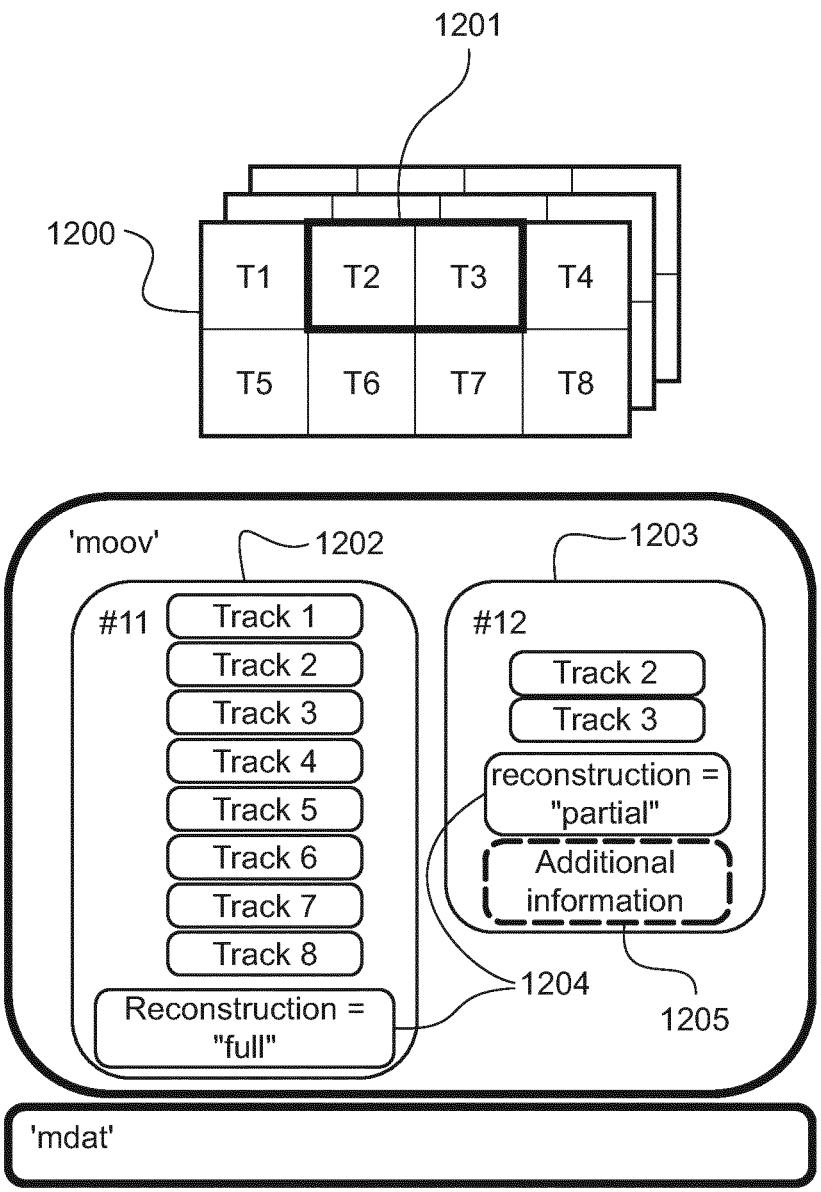
FIG. 11 illustrates an embodiment of a relation between a set of sub-picture tracks and a source image, according to an embodiment of the first aspect of the invention.

FIG. 11 illustrates an embodiment of a relation between a set of sub-picture tracks and a source image, according to an embodiment of the first aspect of the invention. First, a captured image 1200 (e.g. 1011 or 122 by reference to FIG. 1a or 1b) is split into tiles or rectangular regions or spatial sub-parts (8 regions in FIG. 11). On this large image, a region of interest is identified with potential interest for rendering, access or transmission 1201. The encapsulation then generates a description of the captured image 1200 as different track groups 1202 and 1203. 1202 corresponds to a set of sub-picture tracks that when composed together lead to the full picture 1200, as indicated by the information 1204 associated to the track group 1202. As well, the other track group 1203 has similar information 1204 but this time indicating the reconstructed image from the composition of the sub-picture tracks in this track group would lead to a partial view of the source image 1200.

In this example, it is actually an encapsulation choice because an access to the region of interest 1201 is provided as a combination of tracks. The client then determines when deciding to render only the region of interest the list of sub-picture tracks to process. There is no need to process all the sub-picture tracks. Optionally, when the track group does not lead to full reconstruction, the track group description may provide additional information 1205 to explain why the reconstruction is partial. When encapsulating with ISOBMFF, information 1204 and 1205 may be provided as illustrated in FIG. 12.

Figure 12:
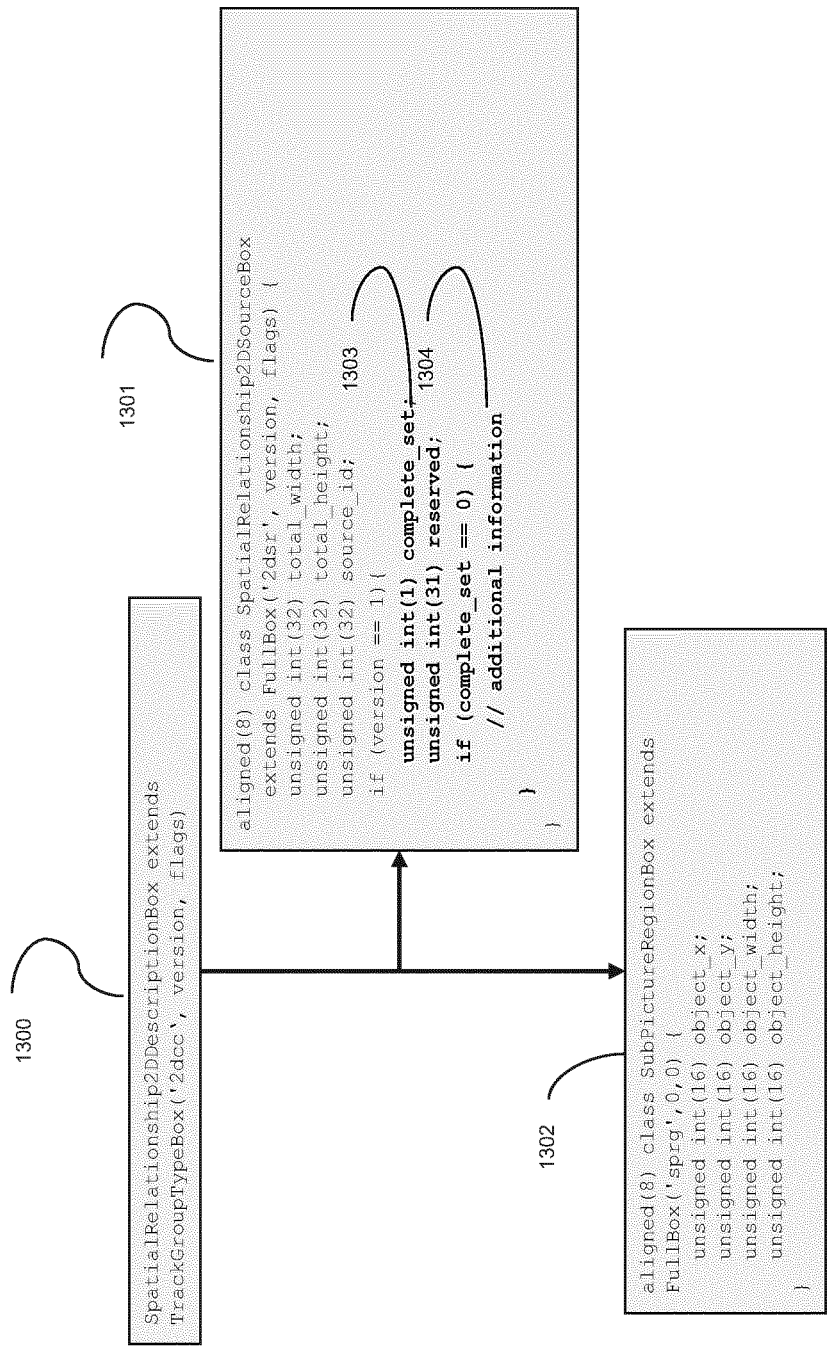
FIG. 12 illustrates an example of track groups for 2D spatial relationships with additional information related to reconstruction, according to an embodiment of the first aspect of the invention.

FIG. 12 illustrates an example of track groups for 2D spatial relationships with additional information related to reconstruction. To preserve backward compatibility, a new version of the '2dcc' box (1300) is proposed that for the part providing the group properties, the '2dsr' box 1301, indicates information 1303 on the set of sub-picture tracks: does it correspond to a "complete set" or not. "Complete set" set to '1' means that the reconstruction from the sub-picture tracks in this track group will correspond to the full source image. "Complete set" set to '0' means that the reconstruction from the sub-picture tracks in this track group will not correspond to the full source image. In the latter case, additional information may be provided 1304. For example, a set of flags can indicate whether gaps exist, or whether there are some overlaps. When one or another is present, a list of gaps or overlaps may be provided as a list of rectangular regions, using the 'sprg' structure. In the case of omnidirectional content, the indication that the set of sub-picture tracks is not a complete set may be interpreted by a parser as an instruction to further inspect the media file, for example by looking for a region wise packing description and by parsing this description when present. For example in case an overlap indication is present in 1304, the parser may determine whether the overlap is due to the presence of guard-bands in the sub-picture tracks. In OMAF, this can be determined by inspecting the region-wise packing box 'rwpk' and checking the guard_band_flag parameter. If the backward compatibility is not an issue, then the additional indication can be directly inserted as additional parameters in one part of the track group for 2D spatial relationship. For example, the indication on complete_set may be provided using 0 for both version and flags values, as follows:

```
aligned(8) class SpatialRelationship2DSourceBox extends
    FullBox('2dsr', 0, 0) {
        unsigned int(32) total_width;
        unsigned int(32) total_height;
        unsigned int(32) source_id;
```

```
        unsigned int(2) reference_picture;
        unsigned int(1) conplete_set;
        unsigned int(29) reserved;
}
``` where the semantics for total_width, total_height and source_id remains unchanged and:
reference_picture (here represented by 2 bits) specifies the source image that has been split into the sub-picture tracks of this track group. When taking value "0", indicates the positions for the sub picture tracks in this track group are expressed in the coordinate system of the captured picture (this is the default value). When taking value "1", indicates the positions for the sub picture tracks in this track group are expressed in the coordinate system of the projected picture. When taking value 2, indicates the positions for the sub picture tracks in this track group are expressed in the coordinate system of the frame-packed picture. When taking value 3, indicates the positions for the sub picture tracks in this track group are expressed in the coordinate system of the packed picture.

In the above example, the additional information related to reconstruction (complete_set parameter) is mixed with source_id and reference picture. It may be provided as well when no information on source_id is present or when no indication on the reference picture is provided:

```
aligned(8) class SpatialRelationship2DSourceBox extends
FullBox('2dsr', 0, 0) {
        unsigned int(32) total_width;
        unsigned int(32) total_height;
        unsigned int(1) complete_set;
        unsigned int(30) reserved;
}
```

In an alternative embodiment, more bits could be allocated to the additional information related to reconstruction. For example, using 2 bits instead of one allows indicating to media players or ISOBMFF parsers whether the reconstruction from the set of sub-picture in the track group leads to complete reconstruction (for example when the 2 bits take value "00", 0 in decimal), or if it leads to a subset of the full picture, i.e. reconstruction contains one or more gaps (for example when the 2 bits take value "01", 1 in decimal) or if it leads to a superset of the full picture, i.e. reconstruction contains parts which are overlapping (for example when the 2 bits take the value "10", 2 in decimal). When the 2 bits take the value "11", 3 in decimal, the reconstruction contains both gaps and overlaps. When more than a simple indication is used to describe information related to reconstruction, the parameters describing the reconstruction may be organized into a dedicated descriptor in the track group description:

```
aligned(8) class SpatialRelationship2DDescriptionBox extends
TrackGroupTypeBox('2dcc') {
        // track_group_id is inherited from TrackGroupTypeBox;
        SpatialRelationship2DSourceBox( );    // mandatory, must be first
        SubPictureRegionBox ( );   // optional
        ReconstructionInfoBox( ); // optional
}
```

Where ReconstructionInfoBox( ) may provide the following information on reconstruction: does the set of sub-picture tracks correspond to the full source, or to a subset (gaps) or to a superset (overlap). Depending on this value, description of where are the gaps is provided, for example as well in case of overlap. Note that there may be both gaps and overlap.

Optionally, a parameter indicates the expected number of sub-picture tracks in the track group. This information, when present in the file, provides the number of sub-picture tracks expected for the reconstruction. For example, when set to 10, while a client, streaming or downloading the media file, does not have 10 sub-picture tracks in the track group, it may not start the reconstruction of the samples. To handle dynamic number of expected sub-picture tracks along time, this information may also be provided in the sample group for 2D spatial relationships '2dcc', so that it can be updated from one media fragment to another. The indication of expected number of sub-picture tracks expected for the reconstruction may also be provided within the properties of the group, for example in the case of track groups for 2D spatial relationships, in the '2dsr' box.

The indication related to reconstruction from sub-picture tracks can be combined with source_indication (source_id parameter of '2dsr'), with reference picture signaling or with equivalent groups signaling described below in a second aspect of the invention. It applies to 2D or to 360° media.

When applied to 360° media, the additional information related to reconstruction is relative to the reference picture indication, when present in the description of the track group for 2D spatial relationships. It may be binary information like the complete_set parameter. It may be the 2 bits value parameter. It may be a parameter indicating the percentage of the projected picture 122 covered by the reconstructed picture resulting from the combination of the sub-picture tracks. When the reference picture is not indicated, the additional information related to reconstruction may indicate with a binary value 00 that the projected picture 122 is fully covered or partially covered (binary value "01"), with a binary value "10" that the packed picture is fully covered or partially covered (value "11"). Depending on the value of the first bit, a parser will determine whether region-wise packing is applied to projected picture and may decide to further analyze the media file when the last bit indicates partial reconstruction. This additional analysis can be used to determine which parts are present or missing in the reconstructed picture. When the last bit indicates full reconstruction, there is no need to further parse or analyze the file to determine that reconstruction is complete.

On the percentage of the reference picture or of the projected picture in 360° video case or of the source picture in 2D video case, optionally, in the part corresponding to track properties within the track group 1302, an additional parameter (not represented on FIG. 12) may provide the contribution of the track to this percentage. For example, for a given group of sub-picture, when a sub-picture track has a significant contribution to the reconstruction, it may be a good indication to start downloading, streaming it first and reconstructing it first when a player implements progressive reconstruction.

Figure 4A:
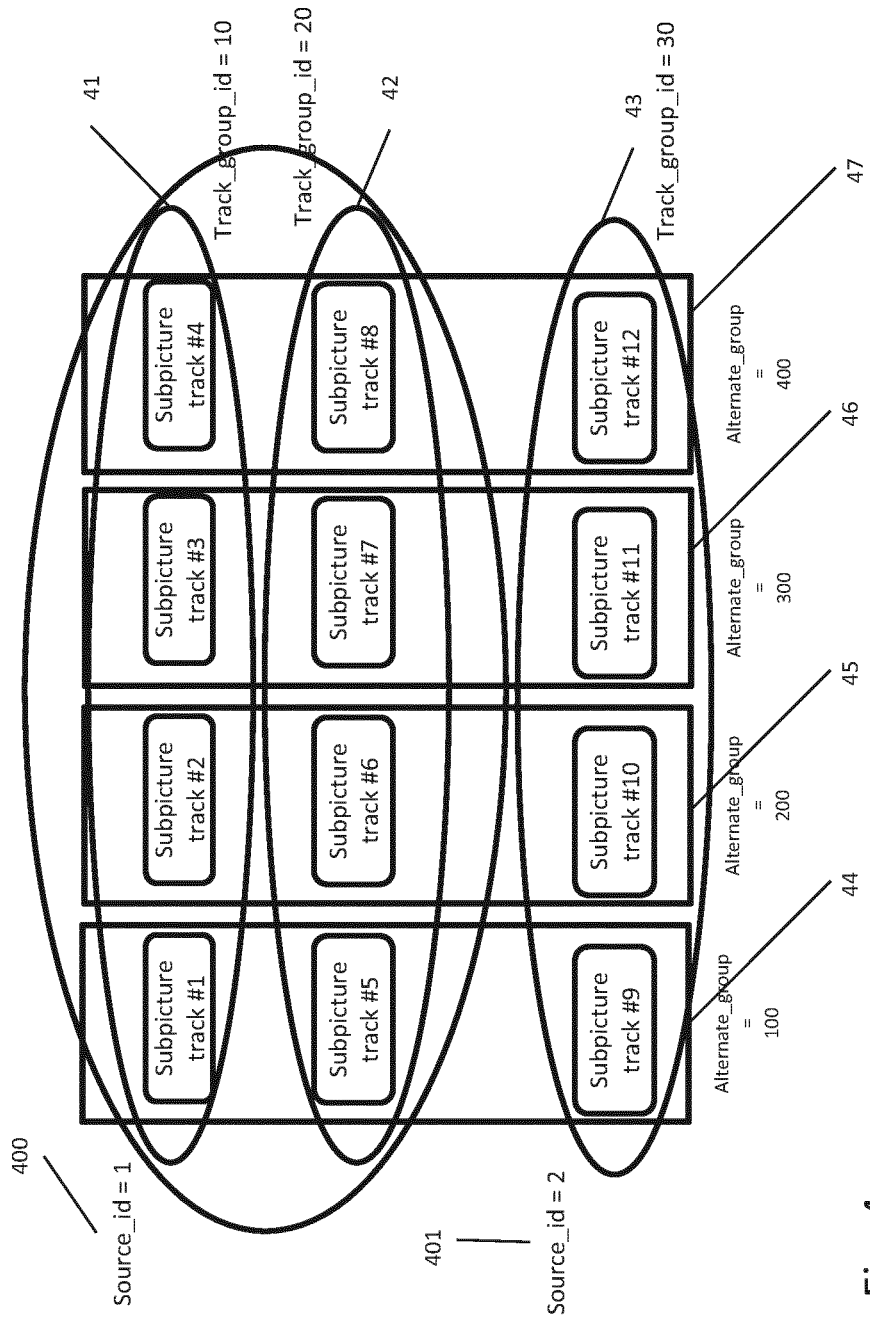
FIG. 4a describes an example of sub-picture track encapsulation containing several track groups for 2D spatial relationships description.

FIG. 4a describes an example of sub-picture track encapsulation containing several track groups for 2D spatial relationships description. This example applies for both 2D or for omnidirectional video.

In this example, Tracks #1 to #4 belong to a track group 41 of type '2dcc' with track_group_id equals to 10 and source_id equals to 1. Tracks #5 to #8 belong to a different track group 42 of type '2dcc' with track_group_id equal to 20 but with the same source_id 400 equals to 1. There is also a third track group 43 of type '2dcc' with a track_group_id equals to 30 and a different source_id 401 equal to 2. In addition, there are several alternate groups 44 to 47. All tracks that belong to the same alternate group (i.e. that have the same alternate_group identifier in their track header box 'tkhd') specify a group or collection of tracks containing alternate data. Alternate data may correspond to alternate bitrate, codec, language, packet size etc. These differentiating attributes may be indicated in a track selection box. Only one track within an alternate group should be played or streamed at any one time. In this example, Tracks #1, #5 and #9 belong to the same alternate group 44 with identifier equal to 100. For instance, track #1 and track #5 are alternate tracks with different qualities, and track #9 is an alternate track to track #1 and track #5 in terms of codec. Tracks #2, #6 and #10 belong to the same alternate group 45 with identifier equal to 200, For instance, track #2 and track #6 are alternate tracks with different resolutions, and track #10 is an alternate track to track #2 and track #6 in terms of frame rate, etc. . . . , and so on.

The track groups 41 and 42 have the same source_id 400 and the track group 43 has a different source_id 401 meaning that sub-picture tracks belonging to track groups 41 and 42 can be combined together (with respect to other constraints, i.e almost one sub-picture track per alternate groups). On contrary, sub-picture tracks from track group 43 are not intended to be combined with any sub-picture tracks from track groups 41 and 42 despite they may belong to a same alternate group because they do not have the same source_id. The source_id parameter then provides an indication to the players on the sub-picture tracks that can be part of a same spatial composition. For a given spatial position, one sub-picture track can be considered visually equivalent to another sub-picture track at the same given spatial position. This is useful for (sub-picture) track selection when the media content is provided into multiple tracks. Moreover, it allows dynamic adaptation (in quality/bitrate or resolution) to display a same spatial composition, depending on the selected the sub-picture tracks.

Figure 4B:
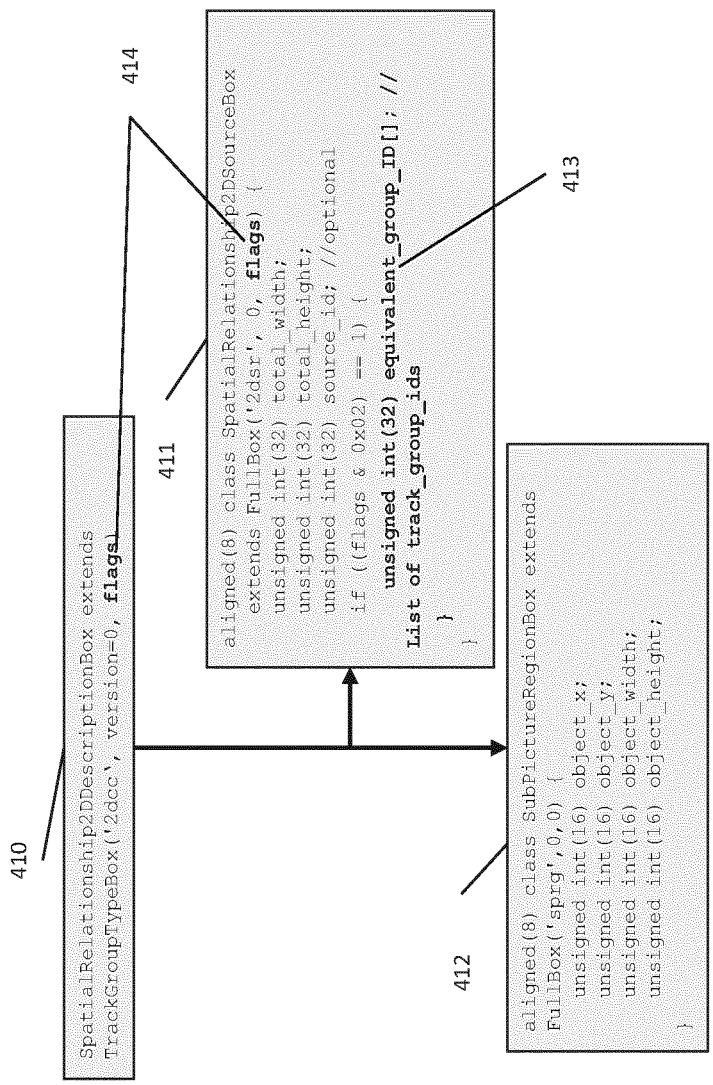
FIG. 4b illustrates, according to a second aspect of the invention, an example about an alternative way to indicate that groups are equivalent groups.

FIG. 4b illustrates, according to a second aspect of the invention, an alternative way to indicate that groups are equivalent groups.

According to an embodiment, it may comprises an indication which is directly in the description of the track group and does no more rely on alternate groups or flags in the track header box. This alternative is useful when the source_id is not present or when there is no track selection box in the media file, so that the players determine alternative tracks when composing the image to display. In this embodiment, the descriptive data about track grouping, called here 'TrackGroupTypeBox', and in particular the descriptive data for 2D spatial relationship description for instance 'SpatialRelationship2DsourceBox' 410, is amended compared to known solutions, as illustrated by reference 411 in FIG. 4b. An additional parameter 413, called here equivalent_group_ID[ ], provides the list of equivalent track groups for this track group. It is described as a list of track_group_id (for example the track_group_id declared in the TrackGroupTypeBox). The FIG. 4b allows a backward compatibility with initial version of the TrackGroupingTypeBox for 2D spatial relationship description. Preferably, the additional parameter 413 for equivalent group signaling is present only
  when the amended version of the box (not illustrated) is used, or
  in the known TrackGroupTypeBox, conditionally to a value of the flags parameter (illustrated 414) value of the TrackGroupTypeBox of type '2dcc'.

For example, the 24-bit integer flag 414 has the following value being defined:

"track_group_equivalence": indicates that this track group has equivalent track groups, meaning that tracks with same properties in this track group and equivalent ones are interchangeable or switchable. Flag value is for example 0x000002 (a reserved 24-bit value, not conflicting with other reserved values for the flags parameter of the track group type box).

As mentioned above, instead of using a reserved value for the flags parameter, the indication of equivalent group may be conditioned to a new version of the structure providing the description of the track group, i.e. the TrackGroupTypeBox, as follows:

```
aligned(8) class SpatialRelationship2DDescriptionBox extends
TrackGroupTypeBox('2dcc', version, 0)
{
    // track_group_id is inherited from TrackGroupTypeBox;
    SpatialRelationship2DSourceBox( );   // mandatory, must be first
    SubPictureRegionBox ( );    // optional
    if (version == 1) {
        GroupEquivalenceBox( );
    }
}
```

With GroupEquivalenceBox being defined as a FullBox:

```
aligned(8) class GroupEquivalenceBox extends
TrackGroupTypeBox('grev')
{
    // track_group_id is inherited from TrackGroupTypeBox;
    unsigned int (32) track_group_IDs[ ];
}
```

Where the track_group_IDs parameter provides a list of track_group_id values identifying track groups that contain tracks "equivalent" to the tracks of this track group. In the example above, the list of equivalent track groups is provided as a new box in the new version of the track group type box. Alternatively, it may be provided as a new parameter of the '2dsr' box, more generally in the box providing the group properties, as follows:

```
aligned(8) class SpatialRelationship2DSourceBox
    extends FullBox('2dsr', version, 0) {
    unsigned int(32) total_width;
    unsigned int(32) total_height;
    unsigned int(32) source_id;
    if (version == 1) {
        unsigned int (32) equivalent_group_ID[ ]
    }
}
```

When, instead of using the version parameter, the flags parameter is used, the description of the group properties for 2D spatial realtionshipd, '2dsr' box 411, would become:

```
aligned(8) class SpatialRelationship2DSourceBox
    extends FullBox('2dsr', version, flags) {
    unsigned int(32) total_width;
    unsigned int(32) total_height;
    unsigned int(32) source_id;
```

```
        if ( (flags&0x02) == 1) {
            unsigned int (32) equivalent_group_ID[ ]
        }
    }
}
```

The declaration of equivalent track groups is not limited to '2dcc' track group type. Indeed, as soon as a track group contains tracks that may be interchangeable with other tracks in other track groups with the same track_group_type, a list of equivalent track groups may be provided in the track group declaration. The matching of each track inside the equivalent track groups is computed by comparing the track properties. For example, in the case of track groups for 2D spatial relationships, any track having the same object_x, object_y, object_width and object_height as another track in one of the equivalent track group can be considered as an interchangeable tracks. It can be for example when encoding with HEVC and independent tiles, sub-picture tracks corresponding to a same tile (same position) in different encoding configuration like quality or bitrate. It can also corresponding to sub-picture tracks from independent bitstreams (e.g. AVC, HEVC . . . ) that could be composed together to reconstruct a given source, As an alternative embodiment for indication of equivalent groups, the equivalence may be signalled within the track properties with respect to its track group. Indeed, a description of a track group, i.e. a TrackGroupTypeBox, may contain a structure (an ISOBMFF box or FullBox) declaring group properties (example the '2dsr' for the '2dcc' track group type 411) and one or more boxes declaring track properties within the track group (example the 'sprg' for '2dcc' track group type 412).

The embodiment illustrated in FIG. 4b suggested declaration of equivalent track groups in the box for group properties 411, thus requiring a parser to compute within each equivalent track group the matching between tracks. An alternative embodiment avoiding this computation consists in declaring as part of the track properties within the track group (for example 412) the equivalence for each track of the track group. For example, when used in the track group for the 2D spatial relationship, the 'sprg' box 412 then becomes:

```
aligned(8) class SubPictureRegionBox extends FullBox('sprg',version,0)
{
    unsigned int(16) object_x;
    unsigned int(16) object_y;
    unsigned int(16) object_width;
    unsigned int(16) object_height;
    if (version == 1) {
        unsigned int(32) equivalent_track_IDs[ ];
    }
}
``` where the equivalent_track_IDs parameter provides the list of track_ID (for the track identifier declared in the track header box) for the tracks that can be considered as equivalent to the current track pertaining to this track group. When, instead of using the version parameter, the flags parameter is used, the 'sprg' box would become:

```
aligned(8) class SubPictureRegionBox extends
FullBox('sprg',version,flags) {
    unsigned int(16) object_x;
    unsigned int(16) object_y;
    unsigned int(16) object_width;
    unsigned int(16) object_height;
    if ( (flags & 0x02) == 1) {
        unsigned int(32) equivalent_track_IDs[ ];
    }
}
```

Having the list of equivalent track groups inside each track group declaration may be costly in terms of bytes. Indeed, track group declaration occurs in each track of the track group. When there are many equivalent groups, the list of track group IDs description is then repeated in each track of each equivalent track group.

An embodiment providing more compact description consists in defining in a single place the equivalence between track groups.

Figure 5:
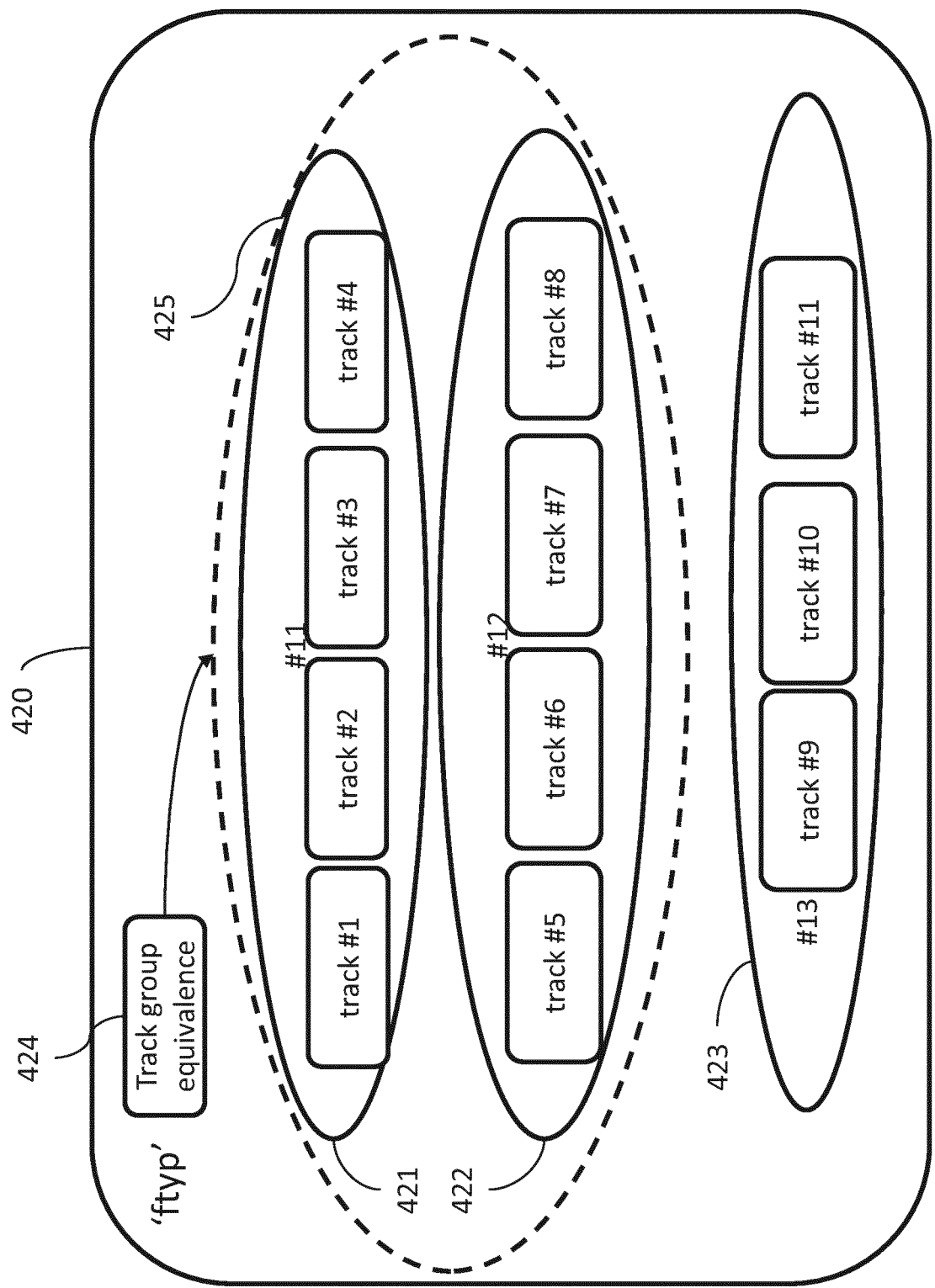
FIG. 5 illustrates an example of another embodiment where the indication of equivalent track groups is provided outside track declaration according to the second aspect of the invention.

FIG. 5 illustrates another embodiment where the indication of equivalent track groups is provided outside track declaration for compactness of the description. Indeed, when the indication of equivalent track groups is provided at track level, for example in the description of the track groups, it is duplicated in each track of the track group. Having this declaration at top-level of the media file, for example under the 'moov' box, allows a single declaration and rapid access to this information by parsers. In FIG. 5, the encapsulated media file 420 contains three track groups: 421, 422, 423, respectively with a track grouping type and track_group_id (#11, #12 and #13). Each track group contains more or less tracks identified by their track_IDs. The track groups 421 and 422 are equivalent as represented by 425. A dedicated box 424 is used to declare this equivalence.

In case the list of track groups is declared using the entity grouping mechanism of ISOBMFF, (i.e. in a GroupListBox), the indication of equivalent track groups is declared with the entity grouping mechanism, for example inside aGroupListBox as an additional descriptor. For example, the descriptor 424 is declared in the ISOBMFF as a structure (or box) providing the lists of equivalence groups, for example a GroupEquivalenceBox (name here is just an example). In the example of FIG. 5, 424 provided as a GroupEquivalenceBox would declare the list: #11, #12 to indicate parsers or players that each track in these track groups are equivalent: track #1 and track #4 may be equivalent, as well as #2 and #6, #3 and #7 and #4 with #8. Optionally, the GroupEquivalenceBox may contain an additional field or parameter providing the type of equivalence. The possible values for this parameter is a pre-defined or registered list of values like for example: "bitstream_equivalence" meaning that tracks are interchangeable when parser is doing sample reconstruction (either implicit or explicit).

Another example of value for the additional field or parameter providing the type of equivalence is another pre-defined or registered value like for example "display_equivalence" meaning that the pictures or sub-pictures resulting from the decoding of these tracks are visually equivalent. For example, in the case of sub-picture tracks, one track from track group #11 may be used with other tracks in track group #12 (or the reverse) to compose and to reconstruct the initial image that was split. Alternatively, instead of describing the indication of equivalent track groups 424 as a GroupEquivalenceBox the indication of equivalent track groups 424 may be provided as one EntityToGroupBox. For example the structure 424 is an EntityToGroupBox with a dedicated grouping_type equal to 'tgeq' for track group equivalence, indicating two entities in the group: the track groups #11 and #12 (as entity_id values). A dedicated grouping type is preferred instead of using the existing 'eqiv' from ISO/IEC 23008-12. This is because the existing 'eqiv' grouping type in EntityToGroupBox, when applied to samples of a track indicates that samples are equivalent to each other inside a same track and potentially with samples in another track or items listed in the EntityToGroupBox. This latter approach also applies when the track groups are declared in a TrackGroupBox 'trgr' of each track. The descriptor or structure for track group equivalence 424 may be stored under a 'meta' box of the media file. It can be for example under the moov/meta box or in meta box at top level of the file.

The descriptor or structure for track group equivalence 424 may also provide the equivalence at track level: in this case, the grouping type value is another reserved code for track equivalence signaling: 'trev'. The entity_ID provided in the structure 424 are then track_IDs. This requires as many EntityToGroupBox(es) with the grouping_type for track equivalence signaling (e.g. 'treV') as there are track to track associations to declare. In the example of FIG. 5, there may be one EntityToGroup with grouping_type 'trev' to declare track #1 and track #5 as equivalent tracks, one for track #2 and track #6, one for track #3 and track #7 and a last one for track #4 with track #8.

As another alternative to the embodiment illustrated on FIG. 4b, the indication of equivalent track groups 424 uses the existing track reference mechanism. However, there is no track reference type available and dedicated to "equivalence" indication. Then it is proposed to define new track reference types 'beqt' and 'deqt' that when used between two tracks respectively indicate that the tracks are equivalent or switchable in terms of bitstream (interchangeable sub-bitstreams during bitstream concatenation or sample reconstruction process) or equivalent in terms of display (i.e. displaying the same content, but potentially at different quality or resolution). While the former allows combination/track replacement in the compressed domain, the latter allows combination/track replacement only after decoding, i.e. in the pixel domain.

The track reference mechanism as defined in ISOBMFF can be extended to also described association between track groups. The current track reference box in the ISOBMFF hierarchy of boxes can only be declared under a 'trak' box. In an embodiment of the invention it is proposed to allow track reference in track group box as well, so that a group of tracks (in the group) can be directly associated to another group of tracks:
Box Type: 'tref'
Container: TrackBox or TrackGroupBox
Mandatory: No
Quantity: Zero or one
with the following semantics:
when used in TrackGroupBox, the track_IDs is an array of integers providing track group identifiers (track_group_id from a TrackGroupTypeBox) of the referenced track groups. The list of possible values to use for the reference type is extended with an 'eqiv' value as follows:
'eqiv': this track group contains tracks that each has an equivalent track in the referenced track group(s). It is up to a parser, depending on the track grouping type and the track properties within the track group to determine which track from the referenced track group correspond to a given track in this track group. For example, in the case of sub-picture tracks, tracks at same position with same size can be considered equivalent. As explained below by reference to FIG. 6 the 'trgr' boxes 601 and 602 could be associated through this 'tref' at track group level. As for alternative embodiments for declaration of equivalent track groups, the track reference type may be more precise in terms of description. Instead of defining a single 'eqiv' track reference type, two new track reference types may be used: one for bitstream equivalence (for example: 'beqv') and another one for display equivalence (for example: 'deqv').

Figure 13B:
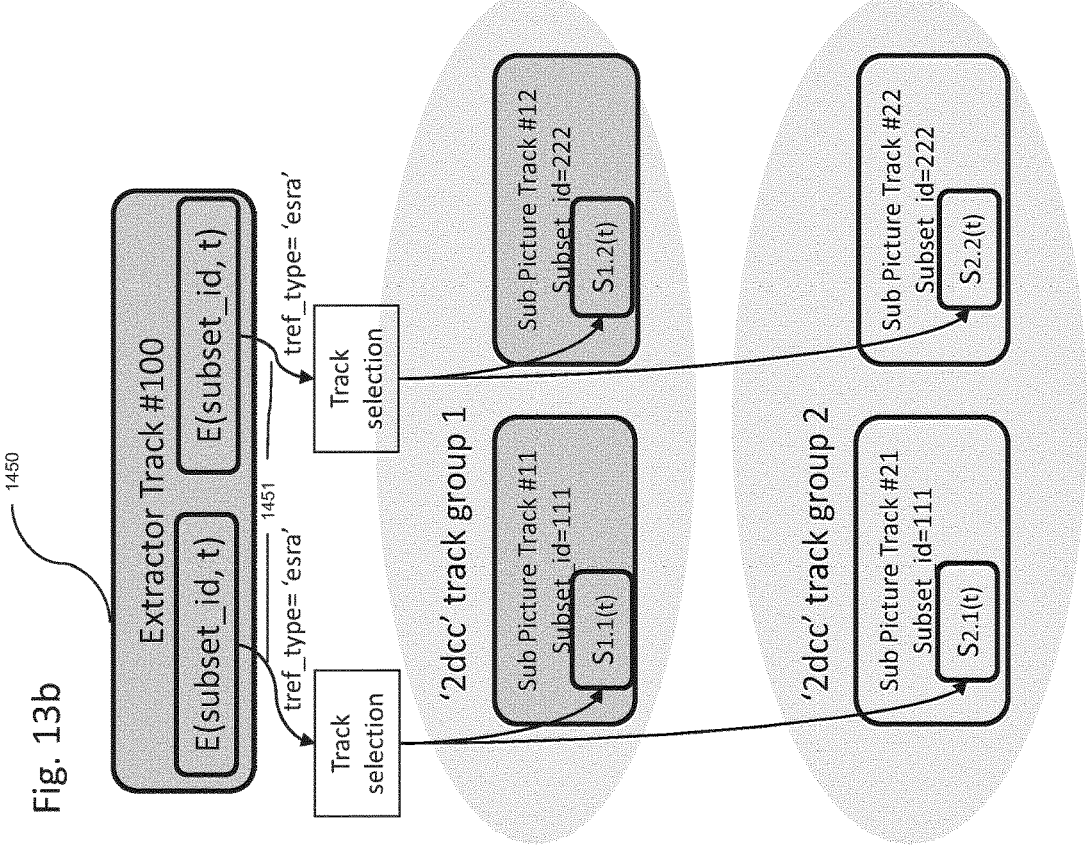
FIGS. 13a and 13b, illustrate explicit reconstruction from alternative sets of sub-picture tracks, according to an embodiment of the second aspect of the invention.
Figure 13A:
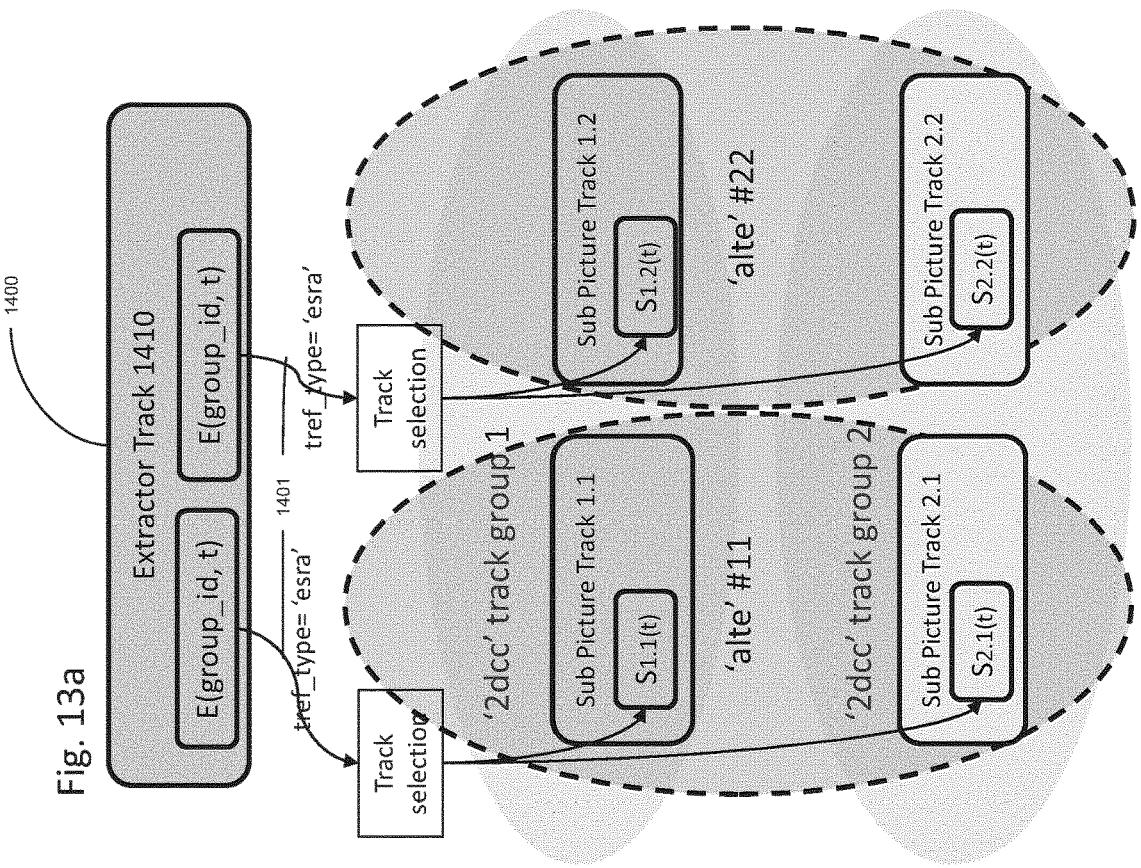

FIG. 13, comprising FIGS. 13a and 13b, illustrate explicit reconstruction from alternative sets of sub-picture tracks. This invention proposes a new kind of Extractor NAL unit to use in Extractor track like 1400 in FIG. 13a or 1450 on FIG. 13b. The ISO/IEC 14496-15 defines Extractor for different compression formats: SVC, MVC, HEVC . . . . HEVC extractors introduce specific constructors to reconstruct a sample from a referenced track or from data provided within the constructor. We propose a new kind of constructor that we can call SampleConstructorWithAlternatives that extend the HEVC and L-HEVC extractors (or any compression format reusing the concept of constructors inside an Extractor) as follows:

```
class aligned(8) Extractor ( ) {
    NALUnitHeader( );
    do {
        unsigned int(8) constructor_type;
        if( constructor_type == 0 )
            SampleConstructor( );
        else if( constructor_type == 2 )
            InlineConstructor( );
        else if ( constructor type == 4 )
            SampleConstructorWithAlternatives( );
    } while( !EndOfNALUnit( ) )
}
```

The semantics of Extractor::constructor_type is updated as follows:
constructor_type specifies the constructor that follows. SampleConstructor, InlineConstructor and SampleConstructorWithAlternatives correspond to constructor_type equal to 0, 2 and 4, respectively. Other values of constructor_type are reserved.

A new section defining the new extractor is added in the Annex of the ISO/IEC 14496-15 for this new constructor to become interoperable between File/segment encapsulation means 150 (e.g. mp4 writers) and File/segment de-encapsulating means 171 (e.g. mp4 readers):
The new sample constructor with alternatives is defined as follows:
Syntax

```
class aligned(8) SampleConstructorWithAlternatives ( ) {
    unsigned int(8) ref_index; // can be a track or a track_group
index
    signed int(8) sample_offset;
    unsigned int((lengthSizeMinusOne+1)*8) data_offset;
    unsigned int((lengthSizeMinusOne+1)*8) data_length;
}
``` with the following semantics
The ref_index specifies the index of the track reference of type 'scal' (or a dedicated track reference type for bitstream equivalence like 1401 or 1451) to use to find the track or the track group containing a track from which to extract data.

sample_offset: as specified in Erreur! Source du renvoi introuvable.
  data_offset: The offset of the first byte within the reference sample to copy. If the extraction starts with the first byte of data in that sample, the offset takes the value 0.
  data length: as specified in A.7.4.1.2 of DCOR3

Such extractor with specific constructor can be used in the encapsulation step from FIG. 2a, step 2242 or FIG. 2b step 242.

Figure 14:
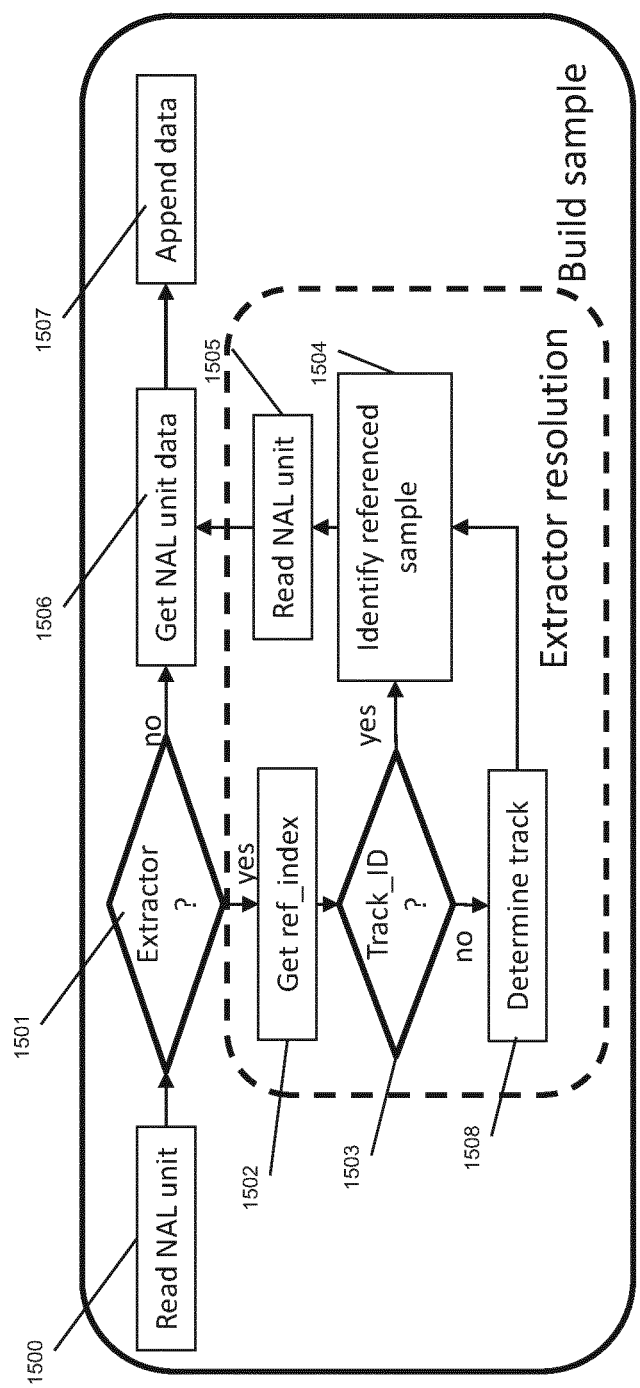
FIG. 14 illustrates the extractor resolution by File/segment de-encapsulation means according to the invention, for example with an ISOBMFF parser, according to an embodiment of the second aspect of the invention.

FIG. 14 illustrates the extractor resolution by a File/segment de-encapsulation means 171 according to the invention, for example with an ISOBMFF parser. While reconstructing samples, the de-encapsulation means read NAL units from the media part of the file. It checks the NAL unit type in step 1500. If it corresponds to a NALU type for an Extractor (test 1501 true) it gets the ref_index parameter in 1502. When the ref_index resolves to a track_ID, (test 1503 true) the ISOBMFF parser identifies the referenced sample in 1504 referenced by the extractor potentially considering the sample_offset given in the constructor and sample description information. It then reads the NAL unit in 1505 and extracts the NAL unit payload in 1506 to append it to the reconstructed bitstream in 1507 resulting from the parsing and to provide to the decoding means 172. When the ref_index resolves to a track_group_id (1503 false), it is up to the ISOBMFF parser to select the most appropriate track in the corresponding track group as indicated by track selection in FIG. 13a. This is done in step 1508. A default behavior is to select the first track in the file having the track group id declared in one of its track groups. If the indication of track group equivalence contains an indication of differentiating attributes (for example reusing an attribute list like in track selection box), this information may be used by a media player to select one track in the list of track pertaining to the track group with the referenced track_group_id. Once the track_group_id has been translated as a track_ID, the ISOBMFF parser follows the steps 1504 to 1508 and keeps on processing the NAL units until the end.

To avoid potential conflicts between track_ID and track_group_id, it is recommended that media files containing this constructor contain in their list of compatible brands a brand indicating that track_ID, track_group_ID, EntityToGroup::group_id shall be unique identifiers.

Note: the above requirement on the brand is simpler than going through all the track groups to check whether the (flags & 1) is true.

This new extractor could reuse 'scal' track reference but this would require an amendment of several parts of ISO/IEC 14496 Part-15. Probably, having dedicated track references indicating "explicit spatial reconstruction with alternatives" ('esra', like in 1401 and 1451) instead of 'scal' would have the benefit of indicating the use of the specific extractor.

FIG. 13b proposes a more compact solution (than FIG. 13a) for the description of interchangeable, mergable or switchable sub-picture tracks than defining both '2dcc' and 'alte' track groups. Erreur ! Source du renvoi introuvable. illustrates how to take benefit of the track group for spatial relationship description to record track equivalence in the meantime. For that, each sub-picture track indicated as pertaining to a '2dcc' track group is also indicated as pertaining to a subset. Tracks inside a same subset are then considered as alternatives, interchangeable or switchable bitstreams tha can be used during bitstream concatenation by ISOBMFF parsers. The subset is identified by a unique identifier that can be used as ref index in the specific SampleConstructorWithAlternatives (track with ID #100). The subset identifier can be declared as a parameter in the '2dsr' box. The use of a subset_identifier costs 4 bytes per sub-picture track where the declaration of 'alte' track costs 24 bytes per sub-picture track. Moreover, this reduces the number of track groups to parse.

In embodiment of FIG. 13b, the description of the properties of the 2D spatial relationship group (the '2dsr' box) is extended to support the declaration of subsets, as follows:

```
aligned(8) class SpatialRelationship2DSourceBox
    extends FullBox('2dsr', 0, 0) {
    unsigned int(32) total_width;
    unsigned int(32) total_height;
    unsigned int(32) source_id;
    unsigned int (32) subset_id;
}
```

Where subset_id is an identifier for set of sub-picture tracks at a same spatial position and that are equivalent or switchable in terms of bitstream. This means that during bitstream concatenation, the bytes for one sample of any one of the equivalent tracks in a subset may be used instead of the bytes for the same sample of any other equivalent tracks in the same subset.

Alternatively, the subset_id may be defined in a set of parameters describing the properties of the track within the track group, for example the 'sprg' box in case of '2dcc' track grouping_type.

When using the compact description of FIG. 13b, the semantic of ref_index in SampleConstructorWithAlternatives 1452 and 1453 is changed as follows to allow referencing subset identifiers sub-picture subsets:

ref_index specifies the index of the track reference of type 'scal' (or 'esra' like 1401 or 1451) to use to find the track, the track group or the subset of a track group containing a track from which to extract data. When the ref_index resolves to a track_group_id or to a subset_id of a track group, it is up to the parser or player to select the most appropriate track in the corresponding track group or subset of a track group. A default behavior is to select the first track in the file having the track group id or subset_id.

To avoid potential conflicts between track_ID, subset_id and track_group_id, it is recommended that media files containing this constructor contain in their list of compatible brands a brand indicating that track_ID, track_group_ID, EntityToGroup::group_id, and subset_id shall be unique identifiers.

The same mechanism can be extended to implicit reconstruction, i.e. when the reconstruction rule is defined at track level and no more at sample level with extractors. A specific track reference type for "implicit reconstruction with alternatives" is defined (for example 'isra'). In case a same tile base track has alternative tile tracks for reconstruction, this specific track reference is used to associate the tile base track to the track group id or the subset_id describing alternative tile tracks. Then a parser processing such file will have an intermediate step of translating the track_reference to the track group_id or subset_id into a track_ID. It can be selection of the first track found having the referenced track_group_id or subset_id or selection based on additional properties associated to alternative sub-picture tracks (like differentiating attributes directly described in the track properties within the track group, like for example the 'sprg' box.

Figure 6:
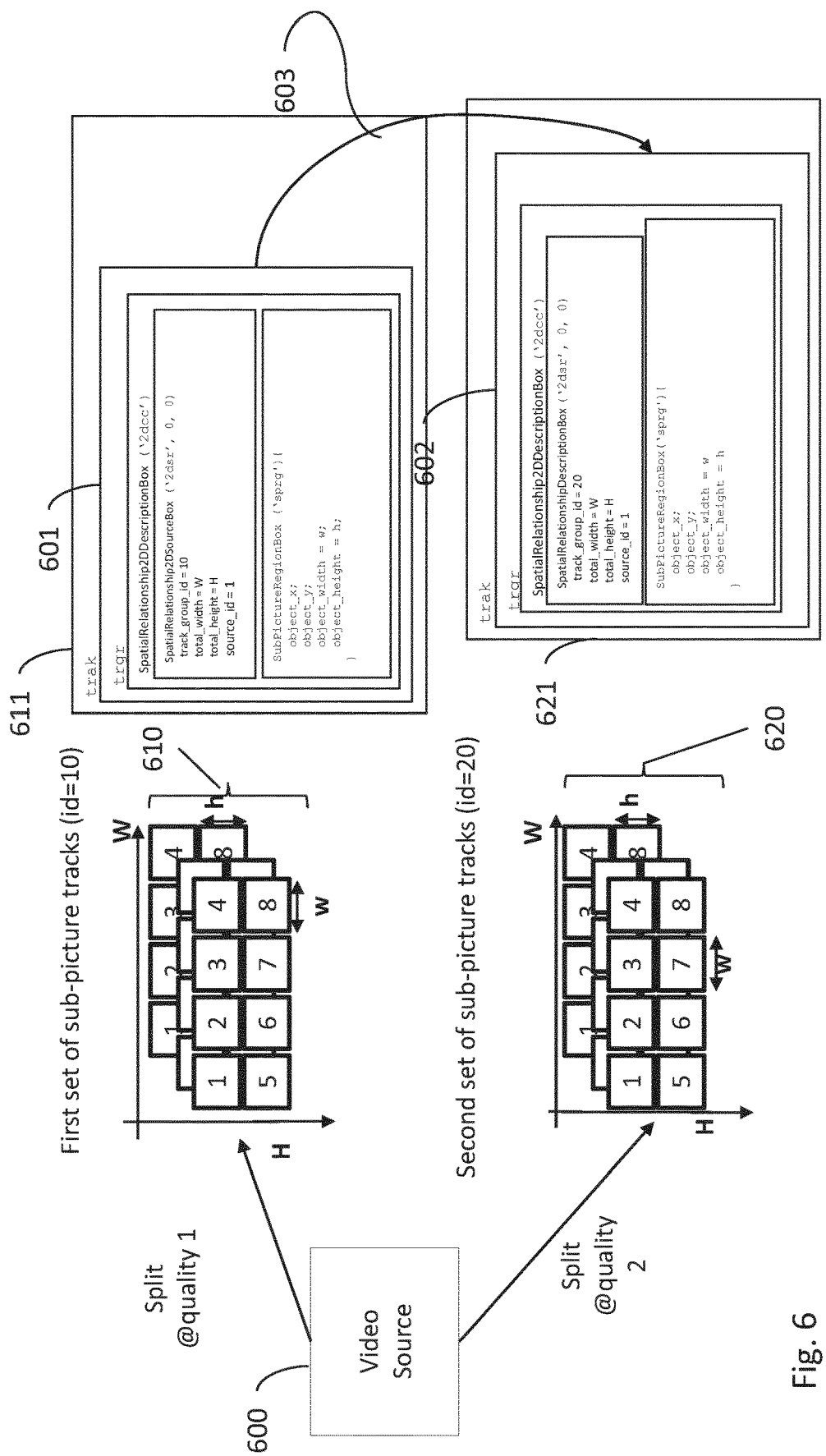
FIG. 6 illustrates an example of use of the SpatialRelationship2DdescriptionBox and the source_id according to embodiments of the invention.

FIG. 6 illustrates a second example of use of the SpatialRelationship2DdescriptionBox and the indication of group equivalence 603 according to embodiments of the invention. The same video source 600 (e.g. the same projected video source) is used to generate two alternative versions, in terms of quality (@quality1 and @quality2). There are two sets of sub-picture tracks: one for the high quality (quality 1) 610 and one for the low quality (quality 2) 620.

The corresponding sub-picture tracks can be described as on the right part of the FIG. 6 (in the 'trak' box hierarchy 611 and 621). Both track groups have the same source_id, and same total_width and total_height corresponding to the resolution of each set of sub-picture tracks. Sub-picture track coordinates (object_x, object_y, object_width, object_height) describe the sub-picture track's spatial relationship or position within their respective track group composition. Again, as both track groups have the same source_id, this means that they represent the same source and sub-picture tracks from the first track group 601 (with track_group_id equal to 10) can be combined with sub-picture tracks from the same track group but also with sub-picture tracks from the second track group 602 (with track_group_id equal to 20) with respect to their respective position in their respective composition.

According to this example, the composition picture represented by the track group 601 with track_group_id equals to 10 can be composed by selecting one sub-picture from the alternate group 602 as indicated by the dedicated track reference 603

On contrary to two-dimensional (2D) video content, OMAF media content represents an omnidirectional media content illustrating the user's viewing perspective from the centre of a sphere looking outward towards the inside surface of the sphere. This 360° media content is then projected in a two-dimensional plane by applying a video projection format. Then, optionally, region wise packing is applied to reorganize regions from the projected picture into packed regions. A 360° media content may also be represented by several circular images captured with a fisheye lens (wide-angle camera lens).

Thus, in the context of OMAF, a 2D picture (resulting from the reconstruction of sub-picture tracks) may be either a projected picture or a packed picture and sub-picture tracks may contain different kind of contents:

sub parts of a projected picture (with no packing),
sub parts of a frame-packed picture, for example when the content is stereoscopic,
sub parts of a projected and packed picture, or
sub parts of a fisheye coded picture.

According to a third aspect of the invention, the definition of SpatialRelationship2DdescriptionBox is improved to indicate whether the size and position coordinates of sub-picture tracks containing OMAF media content are relative to the projected picture, to the packed picture, or to another picture. The third aspect may be combined with both first and second aspects.

In one embodiment, SpatialRelationship2DdescriptionBox is defined so that the size and position coordinates of sub-picture tracks containing OMAF media content are always relative to the packed picture. When there is no packing, the packed picture is equals to the projected picture.

In another embodiment, SpatialRelationship2DdescriptionBox is defined so that the size and position coordinates of sub-picture tracks containing OMAF media content are relative to the projected picture or to the packed picture or any intermediate picture in the processing steps between the capturing step 110 and the encoding step 140. In particular, in the case of the application format for omnidirectional media (OMAF), it is not clear whether positions and sizes expressed in the 2D spatial relationships refer to the projected or to the packed picture.

In one embodiment, the SpatialRelationship2DdescriptionBox is always relative to the packed picture. When there is no packing, the packed picture is the same as the projected picture.

In another embodiment, a preferred approach is to define that SpatialRelationship2DdescriptionBox is always relative to the projected picture.

The method for encapsulating encoded media data corresponding to a wide view of a scene may comprise in some embodiments the following steps:

obtaining a projected picture from the wide view of the scene;
packing the obtained projected picture in at least one packed picture;
splitting the at least one packed picture into at least one sub-picture;
encoding the at least one sub-picture into a plurality of tracks;
generating descriptive metadata associated the encoded tracks, wherein the descriptive metadata comprise an item of information associated with each track being indicative of a spatial relationship between the at least one sub-picture encoded in the track and the at least one projected picture.

Accordingly, no particular signalling of the reference picture is needed. The reference picture is defined to be the projected picture even if the sub-picture are obtained by splitting the packed picture.

The method for encapsulating encoded media data corresponding to a wide view of a scene may comprise in some embodiments the following steps:

obtaining a projected picture from the wide view of the scene;
splitting the projected picture into at least one sub-picture;
encoding the at least one sub-picture into a plurality of tracks;
generating descriptive metadata associated with the encoded tracks, the descriptive metadata comprise a first item of information associated with each track being indicative of a spatial relationship between the at least one sub-picture encoded in the track and a reference picture;
wherein the descriptive metadata further comprises a second item of information indicating the reference picture.

Accordingly, by specifying the reference picture in the metadata, it is possible to generate sub-picture data related to any of the projected picture, the packed picture or any other reference picture independently of the splitting operation.

The table below proposes a practical mapping of the SpatialRelationship2DdescriptionBox track group sizes and coordinates attributes relative to the projected picture in the context of OMAF for sub-picture tracks containing either projected, for example using Equirectangular (ERP) or cubemap projections, packed or fisheye contents. In the table below, "rwpk" is a shortcut for the region-wise packing structure, i.e. a structure that specifies the mapping between packed regions and the respective projected regions and specifies the location and size of the guard bands, if any. As well, 'fovi' is a shortcut for the FisheyeVideoEssentialInfoStruct, a structure that describes parameters for enabling stitching and rendering of fisheye images at the OMAF player.

| Type of the source | total_width/total_height | object_width/object_height | object_x/object_y |
| --- | --- | --- | --- |
| Projected picture (no packing) | Shall be equal to the luma picture size of the projected picture | Shall be equal to width and height of the projected region represented by the sub-picture track's samples (In such a case, shall be equal to width and height declared in the track header box of the sub-picture track) | Shall be equal to the x, y coordinate of the top-left corner of the projected region represented by the sub-picture track's samples within the projected picture |
| Projected and packed picture | Shall be equal to the luma picture size of the projected picture Total_width = rwpk@proj_picture_width Total_height = rwpk@proj_picture_height | Shall be equal to width and height of the projected region represented by unpacking the sub-picture track's samples (In such a case, the projected region resulting from the unpacking of the sub-picture track may contain gaps) | Shall be equal to the x, y coordinate of the top-left corner of the projected region represented by unpacking the sub-picture track's samples within the projected picture |
| Fisheye projected picture | Shall be equal to the luma picture size of the projected image, i.e. the image including all circular images. Total_width = fovi@rect_region_left + fovi@rect_region_width of the last circular image. Total_height = fovi@rect_region_top + fovi@rect_region_height of the last circular image | Shall be equal to the width and height of the rectangular projected region that contains the one or more circular images from the sub-picture track. E.g. in case a sub-picture track contains only one circular image: Object_width = fovi@rect_region_width Object_height = fovi@rect_region_height In case the sub-picture track contains more than one circular image, the object_width (resp. object_height) is equal to the sum of the fovi@rect_region_width (resp. the sum of the fovi@rect_region_height) of the contained circular images | Shall be equal to the coordinates of the top-left corner of the rectangular projected region that contains the one or more circular images from the sub-picture track E.g. in case only one circular image: Object_x = fovi@rect_region_left Object_y = fovi@rect_region_top In case the sub-picture track contains more than one circular image, the object_x (resp. object_y) is equal to the fovi@rect_region_left (resp. the fovi@rect_region_top) of the most top-left circular image in the list of contained circular images. |

Defining SpatialRelationship2DdescriptionBox attributes as relative to the projected picture provides an advantage to the application compared to defining them as relative to the packed picture. Indeed, in case of viewport-dependent streaming, the application may only want to download sub-picture tracks corresponding to current user's viewport (i.e. corresponding to user's field of view and orientation). If the SpatialRelationship2DdescriptionBox attributes are defined as relative to the projected picture, the application can directly use this information from the SpatialRelationship2DdescriptionBox track group to select appropriate sub-picture tracks while it is moving inside the projected picture. Otherwise, the application needs to parse, in addition to track group information, the region-wise packing information located in the VisualSampleEntry to convert sub-picture packed content into the projected picture before being able to select appropriate sub-picture tracks.

Optionally, the track group describing spatial relationship (e.g. the '2dcc' track group) may contain an additional descriptor providing, for a given sub-picture track, its mapping to the 360° sphere. This additional descriptor provides without any computation for the media player the mapping between the 2D video sub-picture track and a 3D viewport, so that selection by the player of the relevant track or set of tracks corresponding to a given user's viewing direction is easier. The track group describing the spatial relationships then rewrites as follows:

```
aligned(8) class SpatialRelationship2DDescriptionBox extends TrackGroupTypeBox('2dcc') {
    // track_group_id is inherited from TrackGroupTypeBox;
    SpatialRelationship2DSourceBox( );    // mandatory, must be first
    SubPictureRegionBox ( );              // optional
    SphericalRegionBox ( );               // optional
}
```

Where the SpatialRelationship2DSourceBox and SubPictureRegionBox respectively describe the 2D coordinate system of the sub-picture tracks pertaining to the track group and their positions and sizes;

Where SphericalRegionBox is a new box defined as follows (the four-character code is just an example, any four-character code may be used, provided it is reserved for the indication of spherical region):

```
aligned(8) class SphericalRegionBox extends FullBox('sspr', 0, 0) {
    SphereRegionStruct(1);
}
```

Where the SphereRegionStruct specifies a sphere region as a triplet (centre_azimuth, center_elevation, center_pitch) or sometimes (yaw, pitch, roll) with ranges for the azimuth (vertical) and elevation (horizontal) dimensions).

Figure 7:
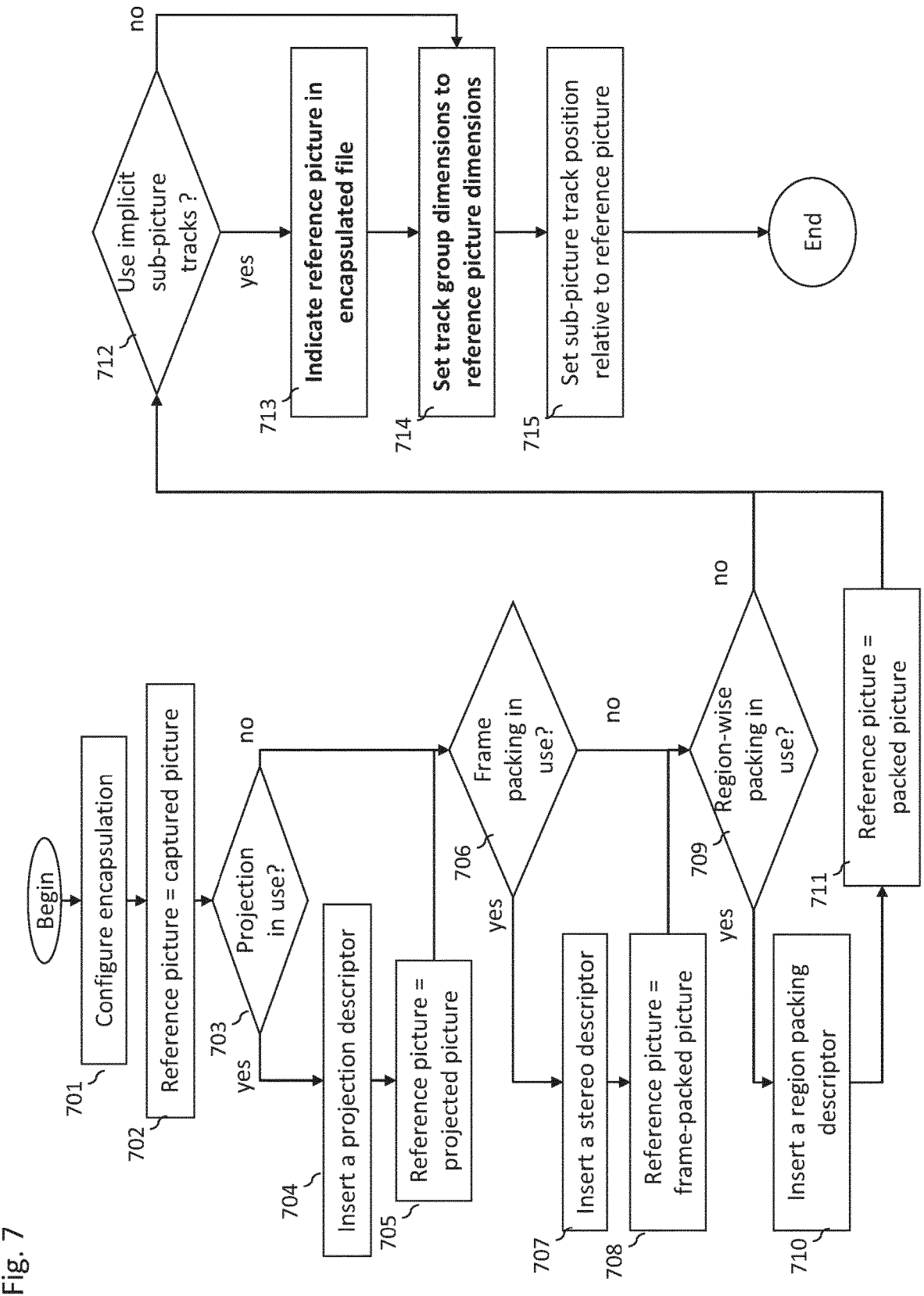
FIG. 7 illustrates the sub-picture encapsulation according to embodiments of the invention of the third aspect of the invention.

FIG. 7 illustrates the sub-picture encapsulation. performed by means 250 of FIG. 1a and the optional means 260 and 280 and 285. In step 701, the user configures the encapsulation module (for example an ISOBMFF writer or mp4 packager or writer in means 150 on FIG. 1a). This can be done through a graphical user interface controlling an encapsulation software. This consists in specifying information on the source to encapsulate or parameters for the encapsulation like decomposition into sub-picture tracks for example, or generation of one single media file or many segment files. Alternatively, this can be pre-registered as settings in the recording device capturing the scene (camera, network camera, smartphone . . . ). Then, the encapsulation module initializes the reference picture in step 702 as the captured image. This consists in storing in RAM of the device running the encapsulation module the sizes of the captured image. Next, at step 703, the encapsulation module checks whether the encapsulation configuration contains a projection step. If false, next step is 706. For example, when captured content is 360° content, it can be projected onto a 2D image, called the projected picture. If a projection is in use (test 703 true) then the encapsulation module inserts (step 704) the description of the projection in use in the descriptive metadata of the media file (or media segments). This can be for example a Projected omnidirectional video box 'povd' according to OMAF specification. Then (step 705), the reference picture is set to projected picture. This means for example that the sizes of this projected picture are stored in memory. The step 706 consists in checking if the captured source is stereoscopic or not and whether the views are packed into a single frame. If the test 706 is true, then the encapsulation module inserts (step 707) in the media file a descriptor for stereo content. In case of OMAF or ISOBMFF it is a StereoVideoBox. If the test 706 is false, next step is 709. Following step 707, the frame-packed picture is stored in memory at the reference picture. The test 709 consists in checking whether the encapsulation configuration indicates that the projected and optionally frame-packed picture needs to be further rearranged into packed regions. If test 709 is true, the encapsulation module inserts (step 710) the description of this packing into regions (equivalent to the optional step 260 of FIG. 1). In the case of OMAF, it can be a RegionWisePackingBox identified by the 'rwpk' box type. Then in 711, the reference picture is set to the packed picture. If test 709 is false, the next step is 712. The test in Step 712 consists in checking the encapsulation configuration: whether implicit signaling or explicit signaling for sub-picture tracks is chosen or set by the user or the application. If the implicit signaling is off, then at step 713, the encapsulation module inserts descriptive metadata providing which reference picture is used for sub-picture track generation (i.e. the picture that has been split into spatial parts, each encapsulated in sub-picture tracks). If the implicit signaling is on, then next step is 714. At step 714, the encapsulation module inserts a track group describing the spatial relationships among the different spatial parts of the split picture. In particular, the size of the resulting composition of the sub-picture tracks is set to the size of the reference picture stored in memory (in 702, 705, 708 or 711). This can be for example the total_width and total_height parameters in the SpatialRelationship2DSourceBox. Finally, at step 715, the encapsulation module describes each sub-picture track in terms of positions and sizes in the reference picture. This consists for example in OMAF or ISOBMFF to put the values resulting from the split into the parameters of the SubPictureRegionBox, when these parameters are static, or in the sample group description box for spatial relationship description (for example the SpatialRelationship2DGroupEntry box).

Figure 8:
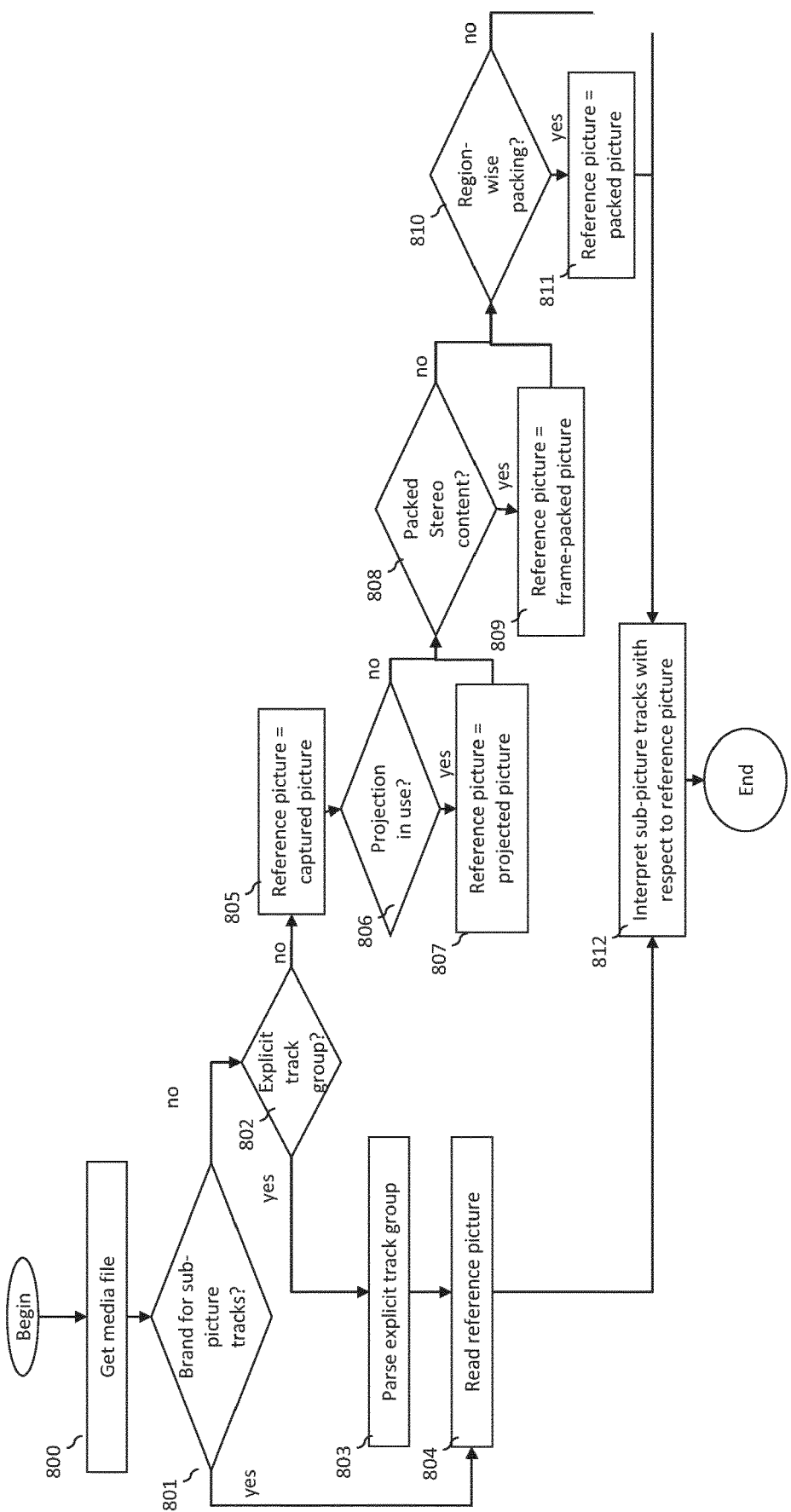
FIG. 8 illustrates the parsing process according to embodiments of the invention.

The explicit signaling of step 713 can be done in various ways as described along with the description of the parsing process as illustrated by FIG. 8.

The method for generating at least one image from a media file comprising a plurality of encoded tracks and associated descriptive metadata may comprise in some embodiments:

determining that the plurality of encoded tracks comprise a group of tracks encoding at least one sub-picture resulting from the splitting of a packed picture obtained by packing a projected picture of a wide view of a scene;

parsing descriptive metadata associated with the group of tracks;

wherein parsing descriptive metadata associated with the group of tracks comprises:

interpreting an item of information associated with each track being indicative of a spatial relationship between the at least one sub-picture encoded in the track and the at least one projected picture.

The method for generating at least one image from a media file comprising a plurality of encoded tracks and associated descriptive metadata may comprise in some embodiments:

determining that the plurality of encoded tracks comprise a group of tracks encoding at least one sub-picture resulting from the splitting of a projected picture of a wide view of a scene;

parsing descriptive metadata associated with the group of tracks;

wherein parsing descriptive metadata associated with the group of tracks comprises:

interpreting a first item of information associated with each track being indicative of a spatial relationship between the at least one sub-picture encoded in the track and the at least one reference picture; and interpreting a second item of information indicating the reference picture.

The media player, using an ISOBMFF parser, receives the OMAF file in 801. It identifies the different tracks present in the media file and in particular the video tracks. For those video tracks, the parser checks whether these are classical 2D videos or video tracks for omnidirectional media that have been projected onto a 2D picture. This is determined by looking at the major brand or in the list of compatible brands in the 'ftyp' box in step 802. For example, a brand set to 'ovdp' indicates that the media file contains a VR experience using the technologies for the OMAF viewport-dependent baseline presentation profile. This invention proposes in an embodiment to define an explicit brand (as major_brand value or to be put in the list of compatible brands) indicating that the VR experience according to an OMAF viewport-dependent profile further uses sub-picture tracks. At least two specific values for brands (major or compatible) may be defined:

A first value may be defined, for example named 'odpr', for omnidirectional dependent profile. This value indicates that the omnidirectional media is split into sub-picture tracks referencing the projected picture. Any ISOBMFF parser or OMAF player compliant to this brand shall interpret sub picture tracks positions as positions in the projected picture. As well, the total_width and total_height shall be respectively interpreted as the width and height of the projected picture.

A second value may be defined, for example named 'odpa', for omnidirectional dependent profile. This value indicates that the omnidirectional media is split into sub-picture tracks referencing the packed picture. Any ISOBMFF parser or OMAF player compliant to this brand shall interpret sub picture tracks positions as positions in the packed picture. As well, the total_width and total_height shall be respectively interpreted as the width and height of the packed picture.

When one of this brand is present, the OMAF player or media player immediately identifies how to get the reference picture information. It then parses the explicit track group for spatial relationship description that contains an indication of the reference picture. This is done at step 803.

When none of these brands is present in the 'ftyp' box, the media file parser or media player has to further parse the media file to determine the presence of sub-picture tracks and whether they reference projected or packed picture (object of test 802). If the track groups describing spatial relationship are explicit tracks groups according to embodiments of this invention, then the parser parses in 803 these explicit track groups. It determines at step 804 the reference picture in use to describe the sub picture tracks in a given track group (identified through the track_group_id for example). This has to be taken into account when presenting sub picture tracks to the user for selection or when rendering the sub picture tracks. Additional transformation may be required to generate the image from the sub picture track expressed in the reference picture to the captured picture. For example when the reference picture is the packed picture, to be expressed in the projected picture, the sub-picture track positions and sizes have to be unpacked. This processing is the object of step 812. We now explain how explicit signaling is performed during encapsulation step 713 to be used by parser in step 803.

In alternative embodiments to the new brands, it is proposed to add an explicit signaling at the track or track group level. This may be done using the '2dcc' track group for 2D spatial relationship description in ISOBMFF. This additional signaling can help parsers or players to handle sub-picture tracks, in particular to determine whether they express position and sizes for the projected picture or for the packed picture.

One embodiment for such signaling may be to define a new parameter in the specific track group type box for the spatial relationship description. Preferably it is defined in the mandatory part of the track group box, namely the SpatialRelationship2DSourceBox, for spatial relationship description, so that a parser can obtain the information.

An example of this embodiment may be:

```
aligned(8) class SpatialRelationship2DDescriptionBox extends
TrackGroupTypeBox('2dcc')
{
    // track_group_id is inherited from TrackGroupTypeBox;
    SpatialRelationship2DSourceBox ( );        // mandatory, must be first
    SubPictureRegionBox ( );                   // optional
}
aligned(8) class SpatialRelationship2DSourceBox              extends
FullBox ('2dsr', 0, 0) {
    unsigned int(32) total_width;
    unsigned int(32) total_height;
    unsigned int(32) source_id;
    unsigned int(1) reference_picture;
    unsigned int(31) reserved
}
``` where "reference_picture" is a new parameter that when taking value "0" indicates that the positions for the sub picture tracks in this group are expressed in the projected picture coordinate system. When taking value "1", it indicates that sub picture tracks in this group are expressed in the packed picture. The name given to this parameter is an example. As well, the total_width and total_height respectively indicate the width and the height of the projected picture.

To be more generic than simply supporting a choice of reference picture between the projected or the packed picture, the reference_picture may take several values, the value corresponding to the intermediate picture to use as reference between the capture and the encoding. For example value 0 may be used for captured image (step 702) when there is no projection, value 1 may be used when there is projection only (step 705), value 2 for frame-packed picture (step 708) and value 3 for packed frame (711). This indication would require 2 bits compared to the previous embodiment supporting only projected and packed frame.

Another embodiment, being more explicit signaling, consists in providing a 4cc code to describe the reference picture (instead of an integer value). This would be more costly in terms of description (4 bytes per sub-picture track). For example, to indicate that reference picture is the projected picture, the reference picture value could be set to 'povd'. For the packed picture, it could be set to 'rwpk'; for frame-packed picture, it could be 'stvi'. For the captured image, the default case could be set to a dedicated four character code: 'dflt' for "default", meaning the captured image. Preferably, a mapping between an intermediate picture and an integer code is defined and registered for example by mp4 registration authority to have interoperable codes for the reference picture value.

The additional reference_picture parameter may alternatively be declared in the optional part of the SpatialRelationship2DDescriptionBox, namely the SubPictureRegionBox. It may be preferable to have it in the mandatory part when explicit signaling is decided in step 712. This is to make sure that the parser or player can find the information.

In another alternative embodiment, additional signaling in the specific track group type box for the spatial relationship description is defined in a way that it preserves backward compatibility with older versions of spatial relationship description in ISOBMFF or OMAF. For that, a new version of the TrackGroupTypeBox is defined, for example version=1 or the same version=0 but with flags value. It is to be noted that TrackGroupTypeBox in prior art does not allow flags value. Providing the TrackGroupTypeBox with flags value is part of this embodiment of the invention.

A flag value "Reference_info_is_present" set for example to the value 0x01, may be defined to indicate that this track group contains information on a reference picture to consider for position and sizes of spatial relationship information. Then the 2dcc track group can be expressed as follows:

```
aligned(8) class SpatialRelationship2DDescriptionBox extends
TrackGroupTypeBox('2dcc', 0, flags)
{
    // track group id is inherited from TrackGroupTypeBox;
    SpatialRelationship2DSourceBox(flags);    // mandatory, must be first
    SubPictureRegionBox ( );                  // optional
```

-continued

```
}
aligned(8) class SpatialRelationship2DSourceBox    extends
FullBox('2dsr', 0, flags) {
    unsigned int(32) total_width;
    unsigned int(32) total_height;
    unsigned int(32) source_id;
    if ( (flags & 0x01) == 1) {
        unsigned int(1) reference_picture;
        unsigned int(31) reserved
    }
}
``` where reference_picture is a new parameter that when taking value "0" indicates that the positions for the sub picture tracks in this group are expressed in the projected picture coordinate system. The name of the parameter is given as an example. As well, the total_width and total_height respectively indicate the width and the height of the projected picture.

Using the flags reduces the description cost of each sub picture track when there is no ambiguity on the reference picture, for example for a 2D classical video. Using the flags to indicate the presence or absence of a reference picture allows reusing the 2dcc track grouping type to handle both cases of splitting an omnidirectional content into sub-picture tracks: with or without the region wise packing step.

In yet another embodiment, the flags parameter of the TrackGroupingTypeBox, or of one of its inheriting boxes like SpatialRelationship2DDescriptionBox, is used to provide the reference picture directly in the flags value. For example when the flags parameter has the least significant bit set to 0, this means that the reference picture is the projected picture in case of omnidirectional video. When the flags parameter has its least significant bit set to 1, then it means that the reference picture is the packed picture in case of omnidirectional video. The default value is the least significant bit of the flags parameter set to 0. With this embodiment, there is no additional parameter in the SpatialRelationship2DSourceBox, which makes the file description more compact (saving 4 bytes per sub-picture track).

In an alternative embodiment, the distinction between implicit or explicit sub-picture tracks signaling is done by using two different tracks grouping types. The current grouping type is used for implicit signaling, a new track grouping type is defined for explicit spatial relationship track group. For example, the four-character code 'edcc' is used and a new TrackGroupingTypeBox is created as follows:

```
aligned(8) class ExplicitSpatialRelationship2DDescriptionBox extends
TrackGroupTypeBox('edcc', 0, flags)
{
    // track_group_id is inherited from TrackGroupTypeBox;
    ExplicitSpatialRelationship2DSourceBox(flags);    // mandatory, must be first
    SubPictureRegionBox ( );                          // optional
}
aligned(8) class ExplicitSpatialRelationship2DSourceBox    extends
FullBox('edsr', 0, flags) {
    unsigned int(32) total_width;
    unsigned int(32) total_height;
    unsigned int(32) source_id;
    unsigned int(8) reference_picture;
}
```

When the encapsulation configuration is determined to be "implicit", (test 801 and 802 false) meaning that no specific signaling is used, the parser goes into implicit determination of the reference picture. It consists by parsing the schemes declared in the restricted information box 'rinf', which transformation or post-decoding operations have to be performed and potentially provide reference picture. Most of the time for OMAF, it can be a packed picture or the projected picture. For stereoscopic content, it may also be the frame packed picture. The parser then checks the presence of OMAF descriptors to determine the candidate reference pictures. The parser assumes that the positions and sizes parameters for the spatial relationship description are expressed with respect to the projected picture when there is no region-wise packing indication in the media file (test 810 false). When a region-wise packing box is present, the positions and sizes parameters for the spatial relationship description are expressed with respect to the packed picture (step 811). Optionally the parser may consider presence or absence of the frame-packed picture by testing for the presence of a 'stvi' box in the sub-picture tracks of the track group describing the spatial relationship (step 808). If present, the parser records the frame-packed picture as a candidate reference picture. More generally, for the implicit signaling, the positions and sizes of the sub-picture tracks are considered expressed in the last picture resulting from the different processing steps between the capture 110 and the encoding 140. These different processing are reflected in the restricted scheme information box 'rinf'. For example, when the content preparation contains projection 120, frame packing 125 and region-wise packing 130, the RestrictedSchemeInfoBox 'rinf' box contains in its SchemeTypeBox a 'povd' box indicating that a projection has been applied. This 'povd' box may itself contain a structure describing the region wise packing done at 130, for example as a RegionWisePackingBox 'rwpk'. As well, a stereo video box is present, for example in a CompatibleSchemeTypeBox, to indicate the frame packing implemented by means 125.

For optimized implicit mode and in closed systems, encapsulation and parser may exchange configuration information or define settings to declare a pre-defined default mode for sub-picture track description. For example, they may agree that sub-picture tracks always reference the projected image when the media contains omnidirectional content.

Figure 9:
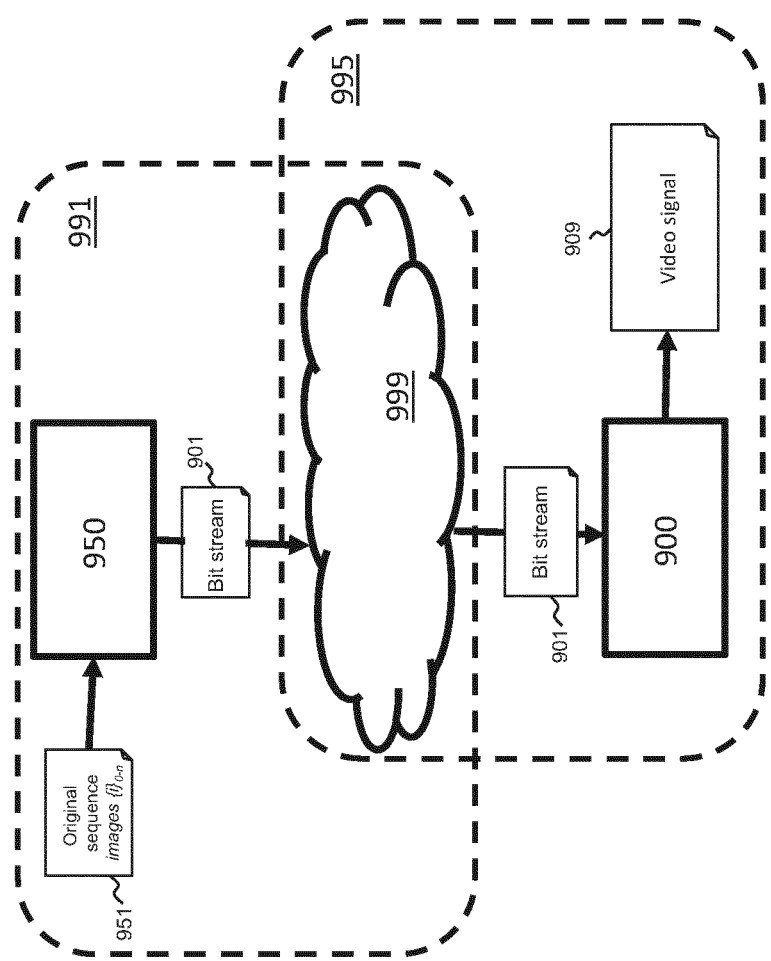
FIG. 9 illustrates a system according to embodiments of the present invention.

FIG. 9 illustrates a system 991 995 comprising at least one of an encoder 950 or a decoder 900 and a communication network 999 according to embodiments of the present invention. According to an embodiment, the system 995 is for processing and providing a content (for example, a video and audio content for displaying/outputting or streaming video/audio content) to a user, who has access to the decoder 900, for example through a user interface of a user terminal comprising the decoder 900 or a user terminal that is communicable with the decoder 900. Such a user terminal may be a computer, a mobile phone, a tablet or any other type of a device capable of providing/displaying the (provided/streamed) content to the user. The system 995 obtains/receives a bitstream 901 (in the form of a continuous stream or a signal—e.g. while earlier video/audio are being displayed/output) via the communication network 999. According to an embodiment, the system 991 is for processing a content and storing the processed content, for example a video and audio content processed for displaying/outputting/streaming at a later time. The system 991 obtains/receives a content comprising an original sequence of images 951, for example corresponding to a wide view scene in embodiments of the invention, which is received and processed by the encoder 950, and the encoder 950 generates a bitstream 901 that is to be communicated to the decoder 900 via a communication network 991. The bitstream 901 is then communicated to the decoder 900 in a number of ways, for example it may be generated in advance by the encoder 950 and stored as data in a storage apparatus in the communication network 999 (e.g. on a server or a cloud storage) until a user requests the content (i.e. the bitstream data) from the storage apparatus, at which point the data is communicated/streamed to the decoder 900 from the storage apparatus. The system 991 may also comprise a content providing apparatus for providing/streaming, to the user (e.g. by communicating data for a user interface to be displayed on a user terminal), content information for the content stored in the storage apparatus (e.g. the title of the content and other meta/storage location data for identifying, selecting and requesting the content), and for receiving and processing a user request for a content so that the requested content can be delivered/streamed from the storage apparatus to the user terminal. Advantageously, in embodiments of the invention, the user terminal is a head mounted display. Alternatively, the encoder 950 generates the bitstream 901 and communicates/streams it directly to the decoder 900 as and when the user requests the content. The decoder 900 then receives the bitstream 901 (or a signal) and performs the decoding of the sub-picture tracks according to the invention to obtain/generate a video signal 909 and/or audio signal, which is then used by a user terminal to provide the requested content to the user.

Figure 3:
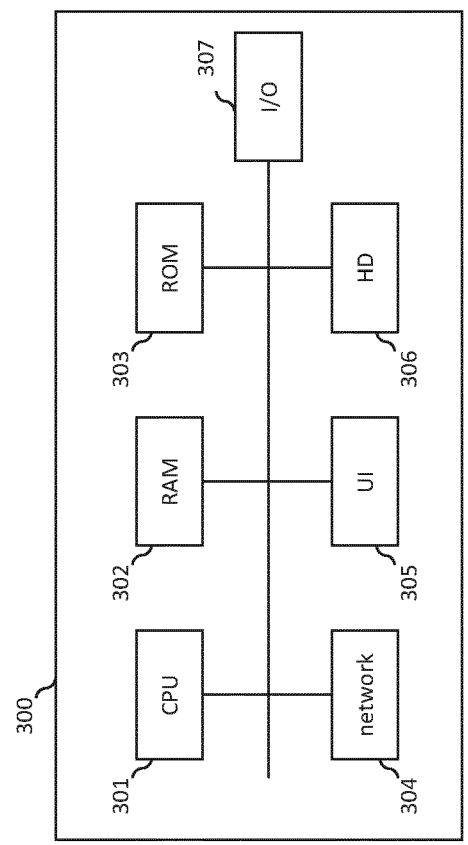
FIG. 3 is a schematic block diagram of a computing device for implementation of one or more embodiments of the invention.

FIG. 3 is a schematic block diagram of a computing device 300 for implementation of one or more embodiments of the invention. The computing device 300 may be a device such as a micro-computer, a workstation or a light portable device. The computing device 300 comprises a communication bus connected to:

a central processing unit (CPU) 301, such as a microprocessor;

a random access memory (RAM) 302 for storing the executable code of the method of embodiments of the invention as well as the registers adapted to record variables and parameters necessary for implementing the method for reading and writing the manifests and/or for encoding the video and/or for reading or generating data under a given file format, the memory capacity thereof can be expanded by an optional RAM connected to an expansion port for example;

a read only memory (ROM) 303 for storing computer programs for implementing embodiments of the invention;

a network interface 304 that is, in turn, typically connected to a communication network over which digital data to be processed are transmitted or received. The network interface 304 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 301;

a user interface (UI) 305 for receiving inputs from a user or to display information to a user;

a hard disk (HD) 306;

an I/O module 307 for receiving/sending data from/to external devices such as a video source or display.

The executable code may be stored either in read only memory 303, on the hard disk 306 or on a removable digital medium such as for example a disk. According to a variant, the executable code of the programs can be received by means of a communication network, via the network interface 304, in order to be stored in one of the storage means of the communication device 300, such as the hard disk 306, before being executed.

The central processing unit 301 is adapted to control and direct the execution of the instructions or portions of software code of the program or programs according to embodiments of the invention, which instructions are stored in one of the aforementioned storage means. After powering on, the CPU 301 is capable of executing instructions from main RAM memory 302 relating to a software application after those instructions have been loaded from the program ROM 303 or the hard-disc (HD) 306 for example. Such a software application, when executed by the CPU 301, causes the steps of the flowcharts shown in the previous figures to be performed.

In this embodiment, the apparatus is a programmable apparatus which uses software to implement the invention. However, alternatively, the present invention may be implemented in hardware (for example, in the form of an Application Specific Integrated Circuit or ASIC).

Although the present invention has been described hereinabove with reference to specific embodiments, the present invention is not limited to the specific embodiments, and modifications will be apparent to a person skilled in the art which lie within the scope of the present invention.

For example, the present invention may be embedded in a device like a camera, a smartphone, a head-mounted display or a tablet that acts as a remote controller for a TV or for multimedia display, for example to zoom in onto a particular region of interest. It can also be used from the same devices to have personalized browsing experience of a multimedia presentation by selecting specific areas of interest. Another usage from these devices and methods by a user is to share with other connected devices some selected sub-parts of his preferred videos. It can also be used with a smartphone or tablet to monitor what happens in a specific area of a building put under surveillance provided that the surveillance camera supports the method for providing data according to the invention.

Many further modifications and variations will suggest themselves to those versed in the art upon making reference to the foregoing illustrative embodiments, which are given by way of example only and which are not intended to limit the scope of the invention, that scope being determined solely by the appended claims. In particular the different features from different embodiments may be interchanged, where appropriate.

The invention claimed is:

1. A method for encapsulating video data in a media file, the video data comprising a plurality of frames, the method comprising:
   obtaining a plurality of tracks, at least some of the tracks being grouped into a group of tracks, the group of tracks being identified by an identifier and a group type;
   generating an extractor track comprising an extractor, the extractor comprising a constructor referencing the identifier of the group of tracks, the constructor being characterized by a constructor type for indicating that the tracks of the referenced group of tracks correspond to alternative tracks, and that any track in the referenced group of tracks may be selected depending on the group type to be the track from which to extract data; and
   encapsulating each of the tracks in a least one media file.

2. A method for generating a bitstream from a media file comprising encoded media data, the method comprising:
   obtaining a Network Abstraction Layer Unit, NALU, belonging to the media file;
   determining that the NALU is an extractor comprising a constructor referencing an identifier of a group of tracks, the group of tracks being identified by the identifier and a group type, the constructor being characterized by a constructor type for indicating that the tracks of the referenced group of tracks correspond to alternative tracks, and that any track in the group of tracks may be selected to be the track from which to extract data;
   selecting depending on the group type a track from the group of tracks from which to extract data;
   identifying a NALU in the selected track that is referenced by the constructor; and,
   append data of the identified NALU to the bitstream.

3. The method of claim 2, wherein the selected track is the first track in the file in the group of tracks.

4. The method of claim 2, wherein data of the identified NALU corresponds to the payload of the identified NALU.

5. A device for encapsulating video data in a media file, the video data comprising a plurality of frames, the device comprising a memory storing executable instructions and a processor configured for:
   obtaining a plurality of tracks, at least some of the tracks being grouped into a group of tracks, the group of tracks being identified by an identifier and a group type;
   generating an extractor track comprising an extractor, the extractor comprising a constructor referencing the identifier of the group of tracks, the constructor being characterized by a constructor type for indicating that the tracks of the referenced group of tracks correspond to alternative tracks, and that any track in the referenced group of tracks may be selected depending on the group type to be the track from which to extract data; and
   encapsulating each of the tracks in a least one media file.

6. A device for generating a bitstream from a media file comprising encoded media data, the device comprising a memory storing executable instructions and a processor configured for:
   obtaining a Network Abstraction Layer Unit, NALU, belonging to the media file;
   determining that the NALU is an extractor comprising a constructor referencing an identifier of a group of tracks, the group of tracks being identified by the identifier and a group type, the constructor being characterized by a constructor type for indicating that the tracks of the referenced group of tracks correspond to alternative tracks, and that any track in the group of tracks may be selected to be the track from which to extract data;
   selecting depending on the group type a track from the set group of tracks from which to extract data;
   identifying a NALU in the selected track that is referenced by the constructor; and
   append data of the identified NALU to the bitstream.

7. A non-transitory computer-readable storage medium storing instructions of a computer program for implementing a method according to claim 1.

* * * * *